US008472908B2

(12) United States Patent
Anguera et al.

(10) Patent No.: US 8,472,908 B2
(45) Date of Patent: Jun. 25, 2013

(54) WIRELESS PORTABLE DEVICE INCLUDING INTERNAL BROADCAST RECEIVER

(75) Inventors: Jaume Anguera, Castellon (ES); Alfonso Sanz, Barcelona (ES)

(73) Assignee: Fractus, S.A., Barcelona (ES)

( * ) Notice: Subject to any disclaimer, the term of this patent is extended or adjusted under 35 U.S.C. 154(b) by 971 days.

(21) Appl. No.: 12/226,024

(22) PCT Filed: Aug. 2, 2006

(86) PCT No.: PCT/EP2006/007782
§ 371 (c)(1), (2), (4) Date: Nov. 14, 2008

(87) PCT Pub. No.: WO2007/128340
PCT Pub. Date: Nov. 15, 2007

(65) Prior Publication Data

US 2009/0156151 A1 Jun. 18, 2009

Related U.S. Application Data

(60) Provisional application No. 60/788,857, filed on Apr. 3, 2006.

(30) Foreign Application Priority Data

May 4, 2006 (EP) .................................... 06113473

(51) Int. Cl.
*H04B 1/06* (2006.01)

(52) U.S. Cl.
USPC ............ 455/272; 343/700; 343/702; 343/804

(58) Field of Classification Search
USPC .......................................................... 455/272
See application file for complete search history.

(56) References Cited

U.S. PATENT DOCUMENTS

| | | | |
|---|---|---|---|
| 3,680,135 | A | 7/1972 | Boyer |
| 5,363,114 | A | 11/1994 | Shoemaker |

(Continued)

FOREIGN PATENT DOCUMENTS

| | | |
|---|---|---|
| DE | 19713929 | 11/1997 |
| EP | 0892459 | 1/1999 |

(Continued)

OTHER PUBLICATIONS von Walter, Sven-Uwe, International Search Report for PCT/EP2006/007782 as mailed Feb. 9, 2007 (2 pages).

(Continued)

*Primary Examiner* — Ajibola Akinyemi
(74) *Attorney, Agent, or Firm* — Winstead PC

(57) ABSTRACT

The invention relates, inter alia, to a wireless portable device for radio communication, comprising at least one antenna element (1210), at least one ground-plane (1250), radio frequency communication circuitry (1310) and at least one matching network (1320). The device is arranged for communication involving, at least, receiving and processing a signal in accordance with a communication system having a bandwidth with a lower frequency limit ($f_{min}$) and an upper frequency limit ($f_{max}$). The antenna element is a non-resonant antenna element for frequencies from said lower frequency limit ($f_{min}$) up to said higher frequency limit ($f_{min}$). Another aspect of the invention involves two antenna elements (2001, 2002) tuned around two different central frequencies within a frequency band, and a switch (2003) for selectively operatively connecting one of said at least two antenna elements to a radio frequency communication circuitry (2000).

18 Claims, 29 Drawing Sheets

U.S. PATENT DOCUMENTS

Figure 1:
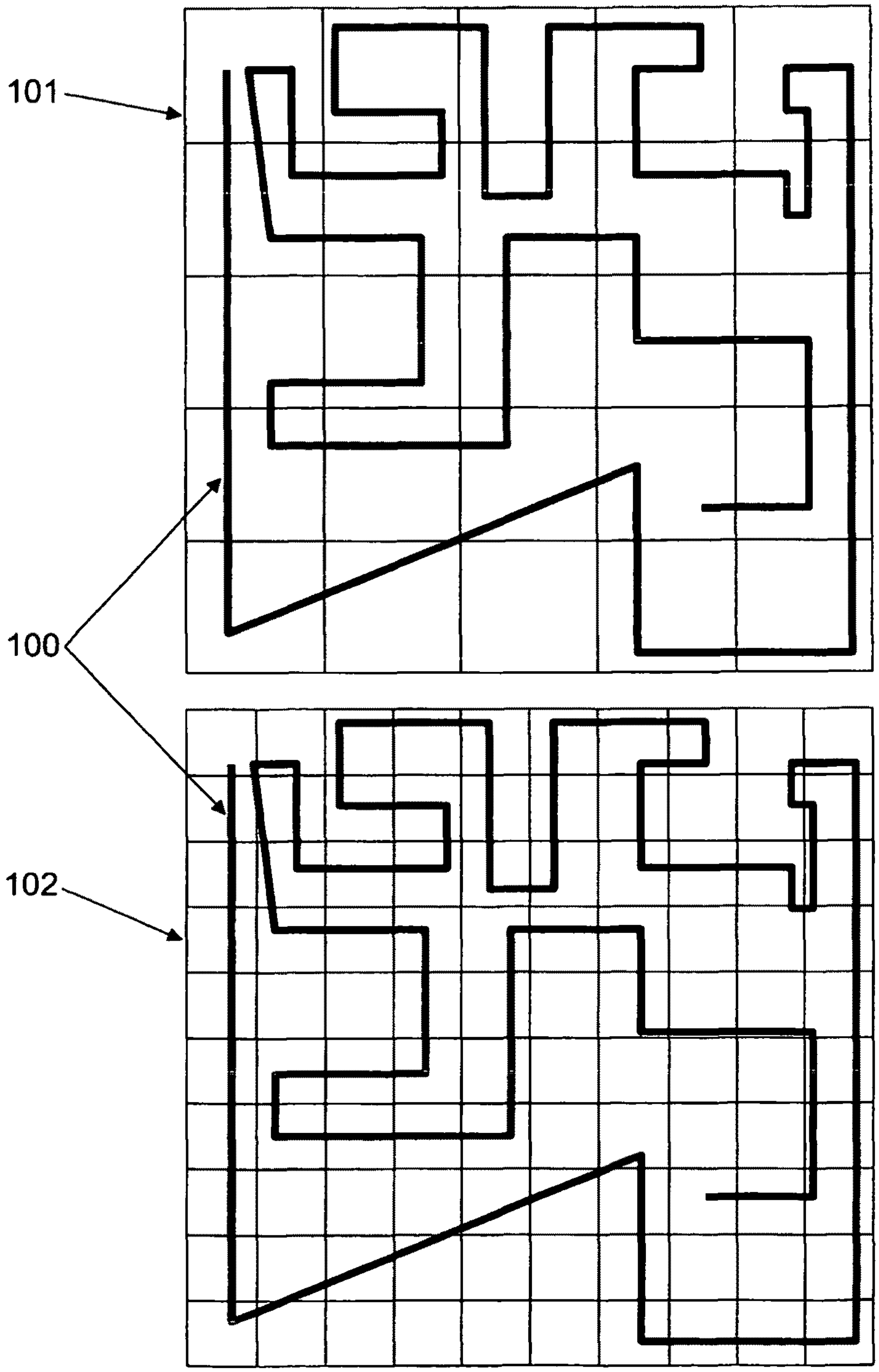

| | | | | |
|---|---|---|---|---|
| 5,420,599 | A | 5/1995 | Erkocevic | |
| 5,489,912 | A | 2/1996 | Holloway | |
| 5,608,417 | A | 3/1997 | De Vall | |
| 5,734,352 | A | 3/1998 | Seward et al. | |
| 6,075,488 | A * | 6/2000 | Hope | 343/702 |
| 6,097,339 | A | 8/2000 | Filipovic | |
| 6,111,545 | A | 8/2000 | Saari | |
| 6,204,819 | B1 | 3/2001 | Hayes et al. | |
| 6,204,826 | B1 | 3/2001 | Rutkowski et al. | |
| 6,211,826 | B1 | 4/2001 | Aoki | |
| 6,297,711 | B1 | 10/2001 | Seward et al. | |
| 6,307,519 | B1 | 10/2001 | Livingston et al. | |
| 6,307,525 | B1 | 10/2001 | Bateman et al. | |
| 6,353,443 | B1 | 3/2002 | Ying | |
| 6,392,610 | B1 | 5/2002 | Braun et al. | |
| 6,429,820 | B1 | 8/2002 | Thursby et al. | |
| 6,456,250 | B1 * | 9/2002 | Ying et al. | 343/702 |
| 6,476,769 | B1 | 11/2002 | Lehtola | |
| 6,498,586 | B2 | 12/2002 | Pankinaho | |
| 6,529,749 | B1 | 3/2003 | Hayes et al. | |
| 6,624,789 | B1 | 9/2003 | Kangasvieri et al. | |
| 6,650,295 | B2 | 11/2003 | Ollikainen et al. | |
| 6,662,028 | B1 | 12/2003 | Hayes et al. | |
| 6,664,930 | B2 | 12/2003 | Wen et al. | |
| 6,693,594 | B2 | 2/2004 | Pankinaho et al. | |
| 6,801,164 | B2 | 10/2004 | Bit-Babik et al. | |
| 6,831,607 | B2 | 12/2004 | Hebron et al. | |
| 6,876,329 | B2 | 4/2005 | Milosavljevic | |
| 6,914,570 | B2 | 7/2005 | Asrani et al. | |
| 6,995,716 | B2 * | 2/2006 | Hwang et al. | 343/702 |
| 7,023,909 | B1 * | 4/2006 | Adams et al. | 375/222 |
| 7,057,560 | B2 | 6/2006 | Erkocevic | |
| 7,081,857 | B2 * | 7/2006 | Kinnunen et al. | 343/702 |
| 7,164,386 | B2 * | 1/2007 | Baliarda et al. | 343/700 MS |
| 7,215,284 | B2 | 5/2007 | Collinson | |
| 7,383,060 | B2 | 6/2008 | Su | |
| 7,391,376 | B2 * | 6/2008 | Yeh et al. | 343/700 MS |
| 7,502,074 | B2 * | 3/2009 | Narita et al. | 348/559 |
| 7,760,146 | B2 | 7/2010 | Ollikainen | |
| 2002/0063658 | A1 | 5/2002 | Washiro | |
| 2004/0041733 | A1 | 3/2004 | Milosavljevic | |
| 2004/0145521 | A1 | 7/2004 | Hebron et al. | |
| 2005/0099343 | A1 | 5/2005 | Asrani et al. | |
| 2005/0128152 | A1 | 6/2005 | Milosavljevic | |
| 2005/0156787 | A1 * | 7/2005 | Myoung et al. | 343/700 MS |
| 2006/0109192 | A1 * | 5/2006 | Weigand | 343/795 |
| 2008/0303729 | A1 | 12/2008 | Milosavljevic | |
| 2012/0038536 | A1 * | 2/2012 | Soler Castany et al. | 343/848 |
| 2012/0119967 | A1 * | 5/2012 | Qi et al. | 343/804 |

FOREIGN PATENT DOCUMENTS

| | | | |
|---|---|---|---|
| EP | 1248317 | | 10/2002 |
| EP | 1296407 | | 3/2003 |
| EP | 1296410 | | 3/2003 |
| EP | 1396906 | | 3/2004 |
| EP | 1469549 | | 10/2004 |
| EP | 1536513 | | 6/2005 |
| EP | 1544943 | | 6/2005 |
| EP | 1545013 | | 6/2005 |
| GB | 2317994 | | 4/1998 |
| JP | 05-007109 | | 1/1993 |
| JP | 11-220319 | | 8/1999 |
| KR | 20070008949 | | 1/2007 |
| WO | WO-0154225 | | 7/2001 |
| WO | 02/052679 | | 7/2002 |
| WO | 03/065499 | | 8/2003 |
| WO | 03/094290 | | 11/2003 |
| WO | 03/096474 | | 11/2003 |
| WO | 2004/097976 | | 11/2004 |
| WO | 2005024997 | | 3/2005 |
| WO | 2005/112188 | | 11/2005 |
| WO | WO-2005112188 | | 11/2005 |
| WO | 2007039668 | A1 | 4/2007 |

OTHER PUBLICATIONS

Holopainen , Jari et al, Antenna for handheld DVB terminal, IWAT 2006, New York, Mar. 8, 2006.

Auckland , D. T. et al, Reconfigurable antennas and RF front ends for portable wireless devices, Proceedings of the 2002 Software Defined Radio Technical Conference, 2001.

Vainikainen , P., Design and measurements of small antennas for mobile terminals—Part II, Helsinki University of Technology, Jun. 22, 2006.

Holopainen , J., Antenna for handheld DVB terminal, Helsinki University of Technology, May 17, 2005.

Kivekas , O. et al, Frequency-tunable internal antenna for mobile phones, 12th International symposium on antennas (JINA 2002) Nice, France, Nov. 12, 2002.

Persson , F. et al, Design of antennas for handheld DVB-H terminals, TEAT, 2006.

Brzezina , G. et al, Planar antennas in LTCC technology with transceiver integration capability for ultra wideband applications, IEEE Transaccions on Microwave Theory and Techniques, Jun. 2006.

Ollikainen , J. et al, Design and implementation techniques of wideband mobile communications antennas, Helsinki University of Technology, Nov. 2004.

Aberle , J. et al. Reconfigurable antennas for portable wireless device. IEEE Antennas and Propagation Magazine, vol. 45. No. 6,, 2003.

McCormick , J. A Low-profile electrically small VHF antenna 15th Annual Symposium on the USAF antenna reserach and development program. Oct. 12, 1965.

Turner , E. M. Broadband passive electrically small antennas for TV application Proceedings of the 1977 Antenna Applications Symposium. Apr. 27, 1977.

Turner , E. M. ; Richard , D. J. Development of an electrically small broadband antenna Symposium on the USAF antenna research and development program, 18th. Oct. 15, 1986.

Jaggard , D. L. Expert report of Dwight L. Jaggard (redacted)—expert witness retained by Fractus. Feb. 23, 2011.

Guterman , J. ; Moreira , A.A. ; Peixeiro , C. Microstrip fractal antennas for multistandard terminals Antennas and Wireless Propagation Letters, IEEE. Dec. 2004.

Warnagiris , T. ; Minardo , T. Performance of a meandered line as an electrically small transmitting antenna Antennas and Propagation, IEEE Transactions on. Dec. 1998.

Jaggard , D. L. Rebuttal expert report of Dr. Dwight L. Jaggard (redacted version) Fractus. Feb. 16, 2011.

Long , S. Rebuttal expert report of Dr. Stuart A. Long (redacted version) Fractus. Feb. 16, 2011.

Jung , C. ; Lee , M. Reconfigurable Scan-Beam Single-Arm Spiral Antenna Integrated With RF-MEMS Switches IEEE Transactions on antennas and propagation. Feb. 2006.

Ammann , M.J. ; Zhi Ning Chen Wideband monopole antennas for multi-band wireless systems Antennas and Propagation Magazine, IEEE. Apr. 2003.

* cited by examiner (a) (b) (c)

(a)

(b)

WIRELESS PORTABLE DEVICE INCLUDING INTERNAL BROADCAST RECEIVER

CROSS-REFERENCE TO RELATED APPLICATIONS

This patent application claims priority from U.S. Provisional Patent Application No. 60/788,857, which was filed on Apr. 3, 2006.

OBJECT OF THE INVENTION

The present invention relates to a wireless device with an internal antenna or antenna system suitable for wireless services requiring a broad bandwidth receiver and/or transmitter. The present invention refers, inter alia, to a portable (for example, handheld) device including an internal antenna system for at least the reception of digital television signals, such as for instance DVB-H (Digital Video Broadcast-Handheld), DMB (Digital Multimedia Broadcasting), T-DMB (Terrestrial Digital Multimedia Broadcasting) or other related digital or analog TV standards or FM. In some embodiments, such a portable device can include means (hardware and software) for wireless (such as mobile and/or cellular) services, whereby the device can be connected to a mobile or wireless network or device. Some embodiments of the present invention can take the form of a handheld device, such as a for instance a handset, a cell phone, a PDA (Personal Digital Assistant), or a smart phone. Such a handheld device can take the form of a single-body compact device, or it can include two or more bodies and a mechanical arrangement to move at least one of those bodies with respect to at least another of said bodies by means of a substantially co-planar displacement, by rotation or pivotation around one or more axes, or by a combination of both.

BACKGROUND OF THE INVENTION

Wireless communication systems are normally based on a transmission of information between a transmitter and a receiver, whereby the information can be modulated on a carrier signal. In radio communication systems, the signal transmitted by the transmitter is captured by one or more antennas at the receiver end, and converted into an electrical signal, which can then be processed so as to extract the relevant information from the signal.

Many wireless communication systems, such as GSM900, GSM1800, UMTS, etc., operate within narrow frequency bands, centred around a centre frequency (such as 900 MHz in the case of GSM900, 1800 MHz in the case of GSM1800, 2000 MHz for UMTS, etc.). Thus, in order to obtain an adequate gain within the relevant frequency band, antenna systems are used that are tuned to the respective frequency band and that include at least one antenna having a resonant frequency substantially corresponding to the centre frequency of said frequency band.

A problem frequently involved with antennas is their size. For example, a dipole antenna having a resonant frequency f should have a length of about $\lambda/2$, where $\lambda$ is the wavelength corresponding to said resonant frequency (such a dipole is often referred to as half-wavelength dipole). A monopole antenna mounted over a ground-plane should have a length of about $\lambda/4$, where $\lambda$ is the wavelength corresponding to said resonant frequency (such a monopole is often referred to as quarter-wavelength monopole). Even for communication systems based on high frequencies (such as GSM900, GSM1800 and UMTS2000, corresponding to wavelengths of approximately 33 cm, 16 cm and 13 cm, respectively), obtaining sufficiently small and still useful antennas has been considered to be a difficult task (normally, external and/or retractile antennas have been used, or the antennas have been helically arranged, so as to reduce the space they occupy in the handheld devices).

In communication systems using lower frequencies and, thus, longer wavelengths, such as FM (operating in the band of 88-108 MHz) and DVB-H (Digital Video Broadcast-Handheld) (operating in the bands of 470-702 MHz, or 470-770 MHz), the long wavelengths can imply that the typical monopole and dipole antennas can be inappropriate for handsets (such as handsets for mobile radio communication, that normally have quite reduced dimensions). For example, at a typical DVB-H centre frequency of 586 MHz, a typical quarter wavelength ($\lambda/4$) monopole antenna would have a length of approximately 12.8 cm. Such a long antenna would not be suitable for a pocket size mobile handset (today, consumers are used to pocket-sized handsets with internal antennas). The size of the external antenna could be reduced by implementing it as a helical wire, but the reduction of the size would imply a reduction of the bandwidth.

However, in many cases, a large bandwidth can be desired. For example, for DVB-H applications, a bandwidth encompassing the band of 470-702 or 470-770 MHz could be desired, together with a gain of not less than −10 dB to −7 dB over said band. Antenna elements are very selective in terms of gain and bandwidth. Although a larger bandwidth can be obtained using lumped components, these components do not provide for an increased gain.

That is, one of the challenges involved with including a TV service in a portable or handheld device relates to the need to cover the wide spectrum that is usually allocated for TV services. For instance, as mentioned above, the DVB-H service in Europe should cover a bandwidth including the 470-770 MHz band (UHF), which implies a relative bandwidth of approximately 50% with respect to the center frequency of said operating band. Other digital and analog TV services and standards, particularly those using the terrestrial broadcast network, would also encompass such a large 50% relative bandwidth at similar frequencies within the VHF-UHF bands.

There is a well known trade-off between antenna size and bandwidth coverage. The smaller the antenna, the smaller the bandwidth. Typical prior art internal antennas for handheld devices feature a 5-15% relative bandwidth at even shorter wavelengths, such as those of cellular, mobile and wireless services (800 MHz-2200 MHz). When an internal antenna is operated outside its typical relative 5-15% bandwidth, the gain, the efficiency and the matching characteristics (VSWR, return-loss) of the antenna become severely degraded, at times to unacceptable levels.

The specifications and characteristics of a digital TV antenna for a portable or handheld device can be very different from those of the internal antennas for conventional mobile services. While a conventional mobile service antenna would require a VSWR<3, a gain better than −2 dBi (dB (isotropic) is the forward gain of an antenna compared to an idealized isotropic antenna) within a 5-15% relative bandwidth (or bandwidths in case of multiband services), a digital TV antenna is usually specified to cover a 50% relative bandwidth with a gain between −10 dBi and 4 dBi or better and a return-loss of −2 dB or better.

Some prior art devices make use of an external antenna, often a mechanically retractable external antenna, to cover TV services. Nevertheless, the use of an external antenna on a small portable device is inconvenient in terms of size (the length of such an antenna is often 7 cm or more), ergonomy, aesthetics, mechanical robustness and durability. It is one of the purposes of the present invention to provide an arrangement for a handheld device including an internal antenna system which is able to provide for the reception of TV services.

An antenna can be characterized by its input impedance, $Z_{in}=R_{in}+jX_{in}$ (that is, the impedance has a real component (the resistive component or resistance) and an imaginary component or reactance (that can be capacitive or inductive). At the resonant frequency (or, as a resonating element normally has more than one resonant mode, at one of the resonant frequencies, for example, at the lowest resonant frequency) the imaginary component equals 0, that is, $X_{in}=0$.

The gain of an antenna system, also referred to as antenna system's efficiency, depends on several features, including the radiating efficiency of the antenna element (which is frequency dependent) and the matching (which is also frequency dependent). "Matching" refers to the reduction of miss match losses that have to be subtracted from the radiating efficiency. Normally, for each antenna, a matching network is used that is adapted to the characteristics of the antenna, including its input impedance. However, as the input impedance is frequency dependent, it can be difficult to provide a matching network that provides an adequate gain all over a wide frequency band. That is, in wide-band communication systems, such as FM and DVB-H, it can be difficult to provide a suitable matching network.

It is important to stress that the reception of the TV signal is limited not only by the design of the antenna, but by the design of the whole device. Usually, the device will include one or more printed circuit boards (PCB) embedding one or more ground-planes. Such a ground-plane is also part of the antenna system and its size has an effect on the quality of reception. In general, the smaller the ground-plane, the smaller the covered bandwidth. It is one of the purposes of the present invention to provide an antenna system for a handheld device which includes a comparatively small ground-plane, as this makes it possible to further reduce the size of the handheld device.

Jari Holopainen, et al. "*Antenna for Handheld DVB Terminal*" 2006 *IEEE International Workshop on Antenna Technology: Small Antennas, Novel Metamaterials*, pp. 305-308, held at White Plains, N.Y., Mar. 6-8, 2006, discloses an example of an antenna allegedly useful for DVB terminals. Here, the EMC shielding and the printed circuit board (PCB) of a handheld terminal are considered to define a metal box, or chassis, which is utilised as part of the antenna. In accordance with the disclosure, surface currents are induced to the chassis capacitively at one end of the chassis, where the electric field has a maximum. The feed is stated to be a non-resonant and practically non-radiating compact coupling element. It is further stated that because of the non-resonant structure, the resonance needs to be achieved outside the antenna, for example, with a matching circuit.

The coupling element is a substantially L-shaped element which is arranged in correspondence with one of the shorter ends of a rectangular ground-plane constituted by the metal layer of a PCB. This shorter end has a width of 75 mm, and the L-shaped element has the same width. It appears that the non-resonant condition of said L-shaped element is due to its limited length with respect to the DVB-H wavelength. However, a 75 mm long conducting element in a coupled antenna structure such as the disclosed one may still provide for a suitable frequency response, when a suitable matching network is used, as suggested in the above-mentioned document.

However, for many handset applications, a width in the order of 75 mm may be inconvenient or unacceptable. This is, for example, the case in many mobile radio communication handsets, where the size is essential.

Thus, there is a need to find an appropriate antenna arrangement suitable for communication systems requiring a large bandwidth and that allows the antennas to be conveniently housed inside small size devices such as handsets, while at the same time providing for the necessary gain.

SUMMARY OF THE INVENTION

A first aspect of the invention relates to a wireless portable device for radio communication (such as a mobile handset or hand-held terminal), comprising

- at least one antenna element;
- at least one ground-plane having a length and a width, no ground-plane having a width larger than 55, 50, or 45 mm;
- radio frequency communication circuitry (such as circuitry for processing video signals or similar, such as DVB-H, DMB, T-DMB and/or FM signals) for processing a signal received through said, at least one, antenna element;
- at least one matching network operatively arranged between said, at least one, antenna element and said communication circuitry;
- wherein said device is arranged for communication involving, at least, receiving and processing a signal in accordance with a communication system (such as DVB-H, DMB, T-DMB and/or FM) having a bandwidth with a lower frequency limit ($f_{min}$) and un upper frequency limit ($f_{max}$).
- In accordance with this aspect of the invention, said, at least one, antenna element is a non-resonant antenna element for frequencies that are not lower than said lower frequency limit ($f_{min}$) and not higher than said higher frequency limit ($f_{max}$), so that the imaginary part of the input impedance (Im(Z(in))) of the antenna element is not equal to zero for any frequency that is not lower than said lower frequency limit ($f_{min}$) and not higher than said higher frequency limit ($f_{max}$). The antenna element is further configured so that the imaginary part of said input impedance is constantly approaching zero when the frequency is increasing within the above-mentioned frequency interval, which implies that the imaginary part of said input impedance, for any selected frequency not lower than said lower frequency limit ($f_{min}$) and not higher than said higher frequency limit ($f_{max}$),
- is closer to zero (or at least not further away from 0) than the imaginary part of said input impedance for any frequency not lower than said lower frequency limit ($f_{min}$) and lower than said selected frequency (this alternative substantially corresponds to the "capacitive" impedance case); or
- is closer to zero than the imaginary part of said input impedance for any frequency not higher than said higher frequency limit (fmax) and higher than said selected frequency (this alternative substantially corresponds to the "inductive" impedance case).

When said imaginary part of said input impedance of the antenna element is positive, the input impedance is said to be "inductive", and when it is negative, it is said to be "capacitive". At resonance, the input impedance is "purely resistive".

In this text, the expression bandwidth is to be interpreted as referring to a frequency band over which the device and antenna system complies with certain specifications, depending on the service for which the devise is adapted. For example, for a device adapted to receive and process a digital television signal, an antenna system having a relative bandwidth of at least 40% (preferably not less than 45% or 50%) together with a gain of not less than −10 dB (preferably not less than −7 dB, more preferably not less than 4 dB) can be preferred. Also, a return-loss of −2 dB or better within the corresponding frequency band can be preferred.

The gain of an antenna depends on factors such as its directivity, its radiating efficiency and its miss match losses. Both the radiating efficiency of the radiating antenna element and the matching characteristics are frequency dependent (even directivity is strictly frequency dependent, although for these cases, directivity remains almost constant across the band, typically changing only 2 to 3 dB). An antenna is normally very efficient at its resonant frequency and maintains a similar performance within the frequency range defined by its bandwidth around its resonant frequency (or resonant frequencies). Outside said frequency range, the efficiency and other relevant antenna parameters deteriorate with an increasing distance to said resonant frequency. This is normally not a substantial problem in narrow-band communication systems, but it can be a big problem in wide-band communication systems, such as FM and DVB-H. A low antenna efficiency, that is the result of the radiation efficiency and the miss match losses, can be compensated or partly compensated, especially when the antenna is severely mismatched by a matching network with high miss match losses. However, also the matching quality is frequency dependent, and the matching network should also be adapted to the input impedance of the antenna. Thus, obtaining a suitable matching quality with low miss match losses all over the relevant wide frequency band, or over the relevant parts thereof, can be a very complex task. One reason for this is that the real (resistive) component of the input impedance of the antenna changes very rapidly with the frequency in a frequency range close to the resonant frequency of the antenna (cf., for example, FIG. 14).

It has been found that this problem can, surprisingly, be substantially solved or reduced if an antenna or antenna element is used that has no resonant frequency within the relevant frequency band, as per the invention. This makes it possible to use an antenna element the input impedance of which can be relatively constant (both in terms of resistance and reactance) within the frequency band, which, in turn, makes it possible to obtain an adequate gain by means of high matching quality (that is, with low miss match losses), with only one matching circuit or with a limited amount of matching circuits: the substantially constant input impedance of the antenna, throughout the relevant frequency band, makes this possible. Thus, the surprising result is that by intentionally using a non-resonant antenna element (which, at a first look, would imply a loss of gain) and by taking advantage of the fact that a high quality matching (that is, low miss match losses) can easily be obtained, it becomes possible to comply with the overall gain requirements of the communication system.

Said at least one matching network can comprise a plurality of different matching networks and switching means arranged so as to selectively operatively connect one of said matching networks to the antenna or between the antenna and the communication circuitry, in accordance with a selected frequency sub-band within said lower frequency limit ($f_{min}$) and upper frequency limit ($f_{max}$). Thus, reception of the signal can be made using the one of said matching networks that is most appropriate at a certain stage, for example, for receiving a certain TV channel or similar. The switch can be implemented in many ways, for example, a switch can be used that is continuously changing its state so as to provide for a continuous "scanning" of the matching networks and of the corresponding "sub-bands". Alternatively, the switch can be selectively set to a fixed state in which it remains until the user decides to change its state, for example, by selecting a different TV channel, or similar.

Another aspect of the present invention refers to a portable or handheld device including radio frequency communication circuitry, an antenna system comprising at least two antenna elements tuned around two or more different central frequencies (within a frequency band having a lower frequency limit ($f_{min}$) and un upper frequency limit ($f_{max}$)), a ground plane, a switch for selectively connecting (only) one of the at least two antenna elements to the communication circuitry, and, optionally, one or more matching networks. In some embodiments, one or more of the at least two antenna elements is acting as a parasitic element for at least one driven antenna element which is operating within its frequency range around its central frequency.

In some embodiments each of the antenna elements covers a certain portion of the required bandwidth, whereby the antenna elements complement each other. In some embodiments, when the antenna element tuned at the higher frequency is under operation (receiving), the antenna element tuned at the lower frequency is acting as a parasitic element, causing the gain curve of the antenna system when only the antenna element tuned to the higher frequency is under operation to feature an additional local maximum at a lower frequency. On the other hand, in some cases where the antenna element tuned at the lower frequency is active, the antenna element tuned at the higher frequency is typically not acting as a parasitic element, although it is also possible to arrange it to act as a parasitic element, if necessary or convenient. In any case, this arrangement, that is, the use of at least one antenna element to act as a parasitic element for another antenna element, can create one or more local maxima of gain of the antenna system while only the other antenna element is under operation, thereby improving the gain of said antenna system in a certain sub-band.

More specifically, said at least two antenna elements can comprise a first antenna element having a first electrical length and a second antenna element having a second electrical length, said first electrical length being larger than said second electrical length, wherein, for said frequency band having a lower frequency limit ($f_{min}$) and un upper frequency limit ($f_{max}$), said first antenna element is arranged to have a maximum of gain at a first frequency ($f_1$), and said second antenna element is arranged to have a maximum of gain at a second frequency ($f_2$), said second frequency being higher than said first frequency, both said first frequency and said second frequency being frequencies within said frequency band ($f_{min}$<f1<f2<$f_{max}$), wherein at least one of said first and second antenna elements is arranged to act as a parasitic element for another one of said first and second antenna elements so that the antenna system has a local maximum of gain at a third frequency ($f_3$) substantially different from said first frequency ($f_1$) and second frequency ($f_2$), said third frequency being a frequency within said frequency band.

Thus, by "creating" this (further) local maximum at the third frequency, the corresponding portion of the "gain" curve can be raised, thus lifting the gain curve over the specified level at and around said third frequency. This can help to increase the bandwidth of the antenna system.

Said third frequency can be lower than said first frequency.

Said "another one" of said first and second antenna elements can be the second antenna element, so that said first antenna element acts as a parasitic element for said second antenna element at said third frequency. This arrangement may be easier to implement than the other way around, and may thus be preferred by some antenna designers.

At least one of said first and second antenna elements can be connected to ground through a matching network including, at least, one inductance or capacitance or both. A matching network can be as simple as made of passive components (such as an inductance or a capacitance) or more complex (for example, comprising active components). A simple matching network including one inductance increases the electrical length of the antenna element and therefore reduces the natural resonant frequency of said antenna element. On the other hand a matching network including one capacitance reduces the electrical length of the antenna element and therefore increases the natural resonant frequency of said antenna element.

In some embodiments of the invention, said at least "another one" of said first and second antenna elements may not be connected to ground through a matching network.

In some embodiments of the invention, which may be more laborious from an antenna designer's point of view (for example, when choosing the relevant antenna parameters for a specific case), said second antenna element can be arranged to act as a parasitic element for said first antenna element, so that said antenna system has a local maximum of gain at a fourth frequency ($f_4$) different from said first frequency ($f_1$), said second frequency ($f_2$) and said third frequency ($f_3$), said fourth frequency ($f_4$) being a frequency within said frequency band. This can even further help to increase the relevant bandwidth of the antenna system.

The combination of two or more antenna elements according to the present invention makes it possible to obtain a gain that could not be easily obtained by a single antenna. At the same time the PCB (ground) can be kept small, even as small as, for example, 90×40 mm or smaller, which makes it possible to reduce the overall size and weight of the portable or handheld device.

The two aspects described above can be combined in the same device.

A further aspect of the invention, which can be combined with one or more of the aspects described above, and which has been found to be especially useful for handheld devices for digital video services, especially for digital video reception within an operating band encompassing the frequency band of 470 MHz-770 MHz (or, for example, 470 MHz-702 MHz) (such as the DVB-H operating band), is based on devices having two ground-planes, or, rather, one ground-plane having two portions. Basically, this aspect of the invention relates to a wireless portable device for radio communication, comprising radio frequency communication circuitry (for example, for DVB-H) and an antenna system comprising at least one antenna element and a ground-plane comprising two electrically interconnected conductive portions that are interconnected by at least two conductive strips (2230, 2240).

It is known to use one conductive strip to interconnect two portions of a ground-plane, in, for example, clam-shell devices for radio communication. However, it has been found that, at least when receiving in an operating band of 470 MHz-770 MHz, the gain can be improved over a substantial portion of the operating band when using two strips to interconnect the portions of the groundplane.

Typically in a clam-shell device for radio communication having two ground-planes, or one ground-plane having two portions, said ground-planes or portions are interconnected by means of a flexfilm for at least data communication and signaling purposes. Said flexfilm can feature an electrical connection between said ground-planes or portions to establish a common grounding. It has been found that by adding a second connection between said ground-planes or portions of the ground-plane the gain can be improved. Said second connection can be implemented as a conducting strip connecting those ground-planes or portions (said conducting strip can comprise a conductive metal strip and, optionally, some lumped elements such as capacitors and/or inductors).

The at least two conductive strips can interconnect a first end portion of a first one of said electrically conductive portions and a second end portion of a second one of said electrically conductive portions. For example, if said electrically conductive portions are substantially rectangular, each of said electrically conductive portions having two shorter sides and two longer sides, said first end portion can correspond to a shorter side of said first one of said electrically conductive portions and said second end portion corresponding to a longer side of said second one of said electrically conductive portions.

The two conductive portions can be pivotally arranged with respect to each other, for example, each portion can be housed in a separate body portion of a device comprising at least two pivotally arranged body portions.

The antenna element can be arranged at one end of a first one of said electrically conductive portions, and said at least two conductive strips can be arranged at an opposite end of said first one of said electrically conductive portions, for examples, near to respective opposite ends of said opposite end of said first one of said electrically conductive portions.

The use of at least two or preferably two conductive strips for interconnecting the ground-plane portions have proved to be especially advantageous at least when a non-resonant antenna system is used, as the one described above.

The antenna system arrangement according to the present invention is compatible with the use of other antenna elements for the coverage of cellular mobile services (such as for instance GSM850, GSM900, GSM1800, GSM1900, UMTS, CDMA, W-CDMA, CDMA2000, . . . ) since it can provide for the reception of TV signals with minimum coupling or disturbance of the cellular/mobile antenna.

In some embodiments of the invention, at least one antenna element can comprise at least one conductive portion and a plurality of switches arranged in said conductive portion, said switches being arranged for selectively setting the effective electrical length of the antenna element to one of a plurality of values, for tuning the antenna element. This arrangement makes it possible to electronically tune an antenna element and system already incorporated into a device, such as a handset.

At least one antenna element can be arranged (or at least substantially arranged) over a ground-plane free area, that is, over an area where there is no ground plane in correspondence with the foot-print of the antenna or, at least, in correspondence with part of said foot-print. This has been found to make it possible to increase the gain of the antenna system.

The abovementioned lower and upper frequency limits will depend on the service to be covered by the device. For example, for DVB-H services, said lower frequency limit can be around 400-500 MHz, for example, (approximately) 470 MHz, and said upper frequency limit can be around 650-800 MHz, for example, around 700-800 MHz, for example, around 702 or 770 MHz. In some embodiments suitable for FM communication, said lower frequency limit can be less than or around 88 MHz, and said upper frequency limit can be above or around 108 MHz. In some embodiments suitable for T-DMB, said lower frequency limit can be around 180-186 MHz and said upper frequency limit can be around 204-210 MHz.

The device can be a handheld device, such as a handset for cellular telecommunication. It can also be any other kind of portable device including signal processing circuitry, such as a portable computer with means for wireless communication, etc.

The device can include means for processing digital television signals and for displaying corresponding video images.

The device can be a device adapted for receiving digital television signals.

In accordance with some embodiments of the invention, the antenna elements (or at least one of them) can include a portion shaped as a space-filling curve. This can further help to reduce the size of the antenna.

Said curve can, for example, comprise at least five segments, wherein each of said at least five segments forms an angle with each adjacent segment in said curve, wherein at least three of the at least five segments of said curve are shorter than one-fifth of the longest free-space operating wavelength of the antenna, wherein each angle between adjacent segments is less than 180°, and at least two of the angles between adjacent sections are less than approximately 115°. This is considered to be helpful to reduce the size of the antenna. The curve can, for example, be arranged such that at least two of the angles are defined respectively in the clockwise and counter-clockwise directions at opposite sides of the curve. Said at least two angles can be smaller than 180°, for example, smaller than 115°.

In some embodiments of the invention, at least three of the at least five segments of said curve are shorter than one-tenth of the longest free-space operating wavelength of the antenna. In some embodiment of the invention, a majority of the at least five segments of said curve are shorter than one-fifth of the longest free-space operating wavelength of the antenna.

In accordance with some embodiments of the invention, at least one of said antenna elements can include a portion shaped as a box-counting curve. Said curve can, for example, have a box-counting dimension larger than 1.15, 1.5 and/or 2.

In accordance with some embodiments of the invention, at least one of said antenna elements can include a portion shaped as a grid dimension curve; this curve can have a grid dimension larger than 1.15, 1.5 and/or 2.

The curve can be fitted over a flat or curved surface.

In accordance with some embodiments of the invention, the curve can comprise segments that are arranged in a self-similar way with respect to the entire curve, so that the curve is a self-similar curve.

In accordance with some embodiments of the invention, said curve can be a curve selected from the group consisting essentially of the Hilbert, Peano, SZ, ZZ, HilbertZZ, Peanoinc, Peanodec, and PeanoZZ curves (cf. WO-A-01/54225 which describes these curves and which is incorporated herein by reference):

In accordance with some embodiments of the invention, the segments of the curve can be arranged in a dissimilar way with respect to the entire curve, whereby the curve is not a self-similar curve.

In accordance with some embodiments of the invention, each antenna element fits in a rectangle the largest side of which has a length that does not exceed one-fifth of the longest free-space operating wavelength of the antenna element, or even one-twentieth of the longest free-space operating wavelength of the antenna.

In accordance with some embodiments of the invention, at least one of said antenna elements includes a portion having a multi-level structure.

Of course, although the different aspects of the invention disclosed herein can be applied or implemented separately, it is also possible to combine them, when appropriate.

In some embodiments, the antenna system of the portable or handheld device can be re-used by the cellular, wireless or mobile service to enhance the transmission or reception of wireless or mobile signals. This can be achieved by switching off the TV service while connecting the TV antenna subsystem to the mobile/cellular subsystem. Such a connection can be made through a radio-frequency (RF) ground-plane embedded on the PCB of the device.

One of the advantages of certain embodiments of the present invention is that the device can be able to keep its performance under normal operating conditions, also when the user is holding the device with his/her hand and/or close to his/her body. The particular arrangement of the antenna inside the device, according to certain aspects of the present invention, makes it possible to minimize the effect of the human body on the signal reception, and in some cases, even to enhance the reception of the TV signal. It has been observed that a direct contact between the user and the ground-plane can improve reception. Thus, it is considered that, at least in certain cases, it can be preferred to provide the wireless device with a conductive or metal external surface or casing, for example, by painting a plastic casing with a metallic or other type of conductive paint or coating, so that when the user touches the device during use of the device, the user will be in contact with the ground-plane. This has been found to improve DVB-H performance, especially at the medium and lower frequencies of the 470 MHz-770 MHz band.

Although one of the main objects of the present invention is a device, antenna system and means to receive digital TV signal, the person skilled in the art will notice that the present invention might be useful for the reception of other analog or digital signals with similar requirements in terms of bandwidth and gain. As well, a device, antenna system and method according to the present invention may be useful for transmission of digital or analog signals in a portion or even the whole bandwidth (with a lower frequency limit ($f_{min}$) and an upper frequency limit ($f_{max}$)) provided that the efficiency is sufficient in said portion or in the whole band.

LIST OF FIGURES

FIG. 1—Example of how to calculate the box counting dimension.

Figure 2:
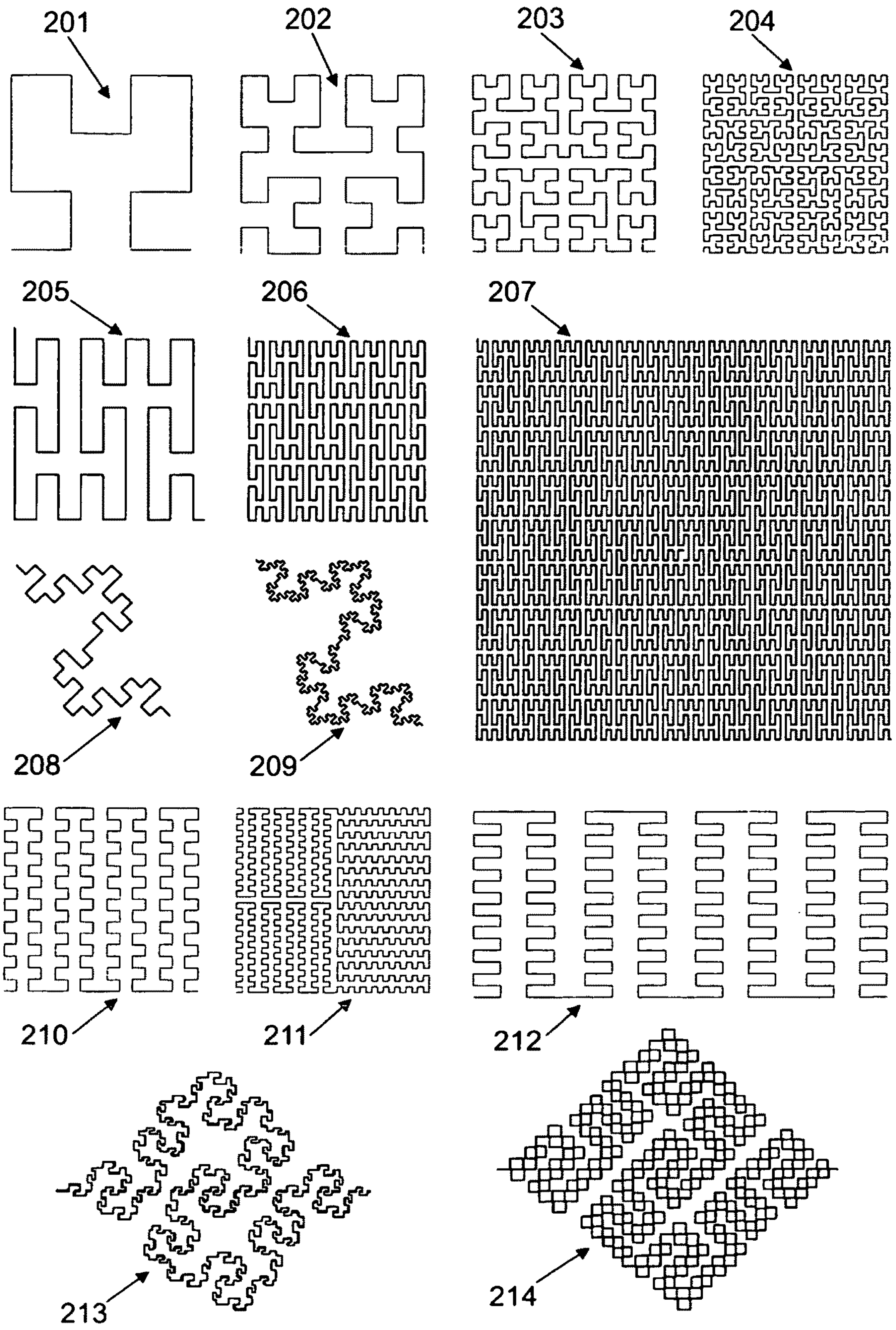

FIG. 2—Examples of space filling curves for antenna design.

Figure 3:
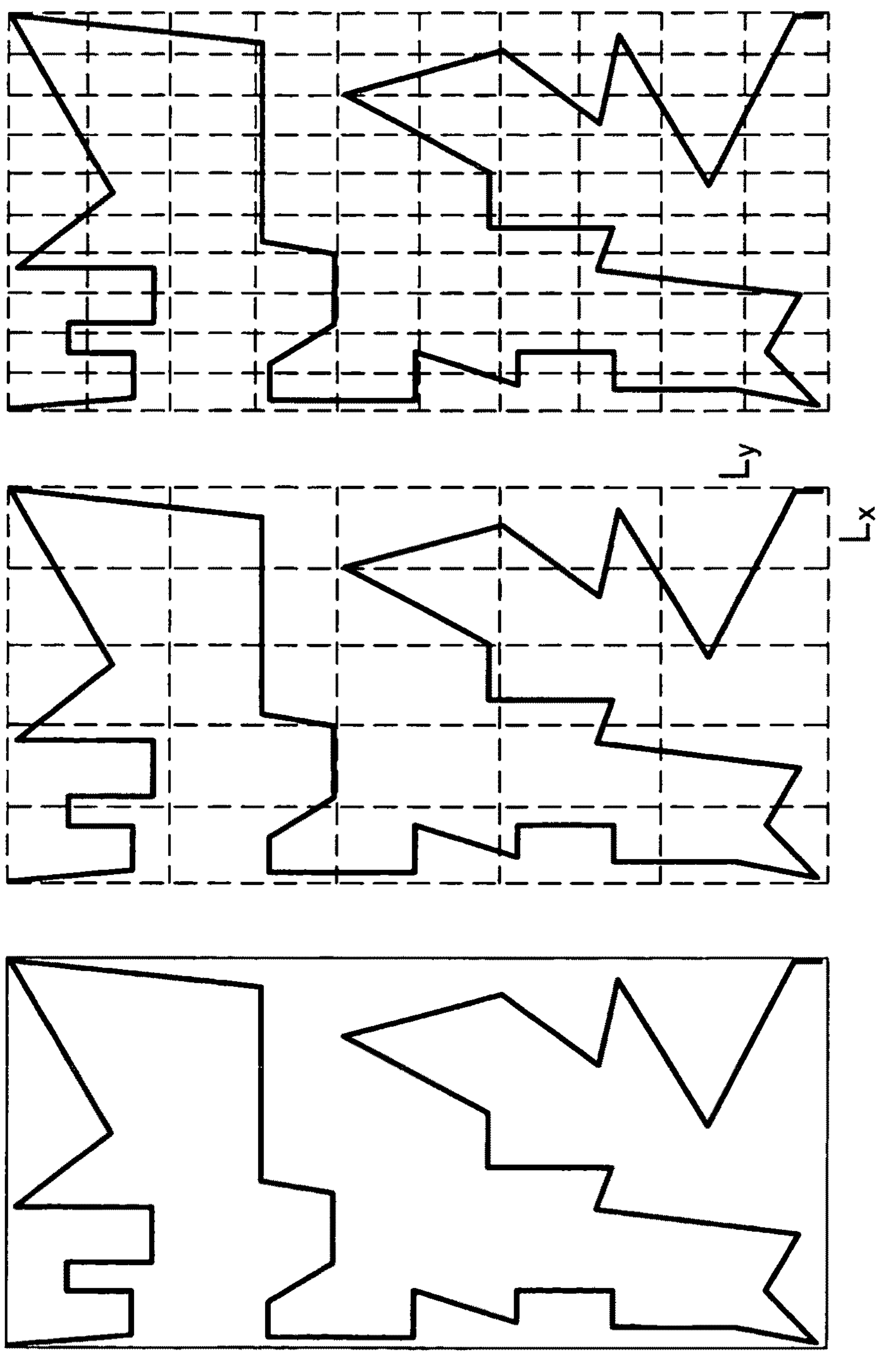

FIG. 3—Example of how to calculate the box counting dimension using a grid of rectangular cells to divide the smallest possible rectangle enclosing the curve.

Figure 4:
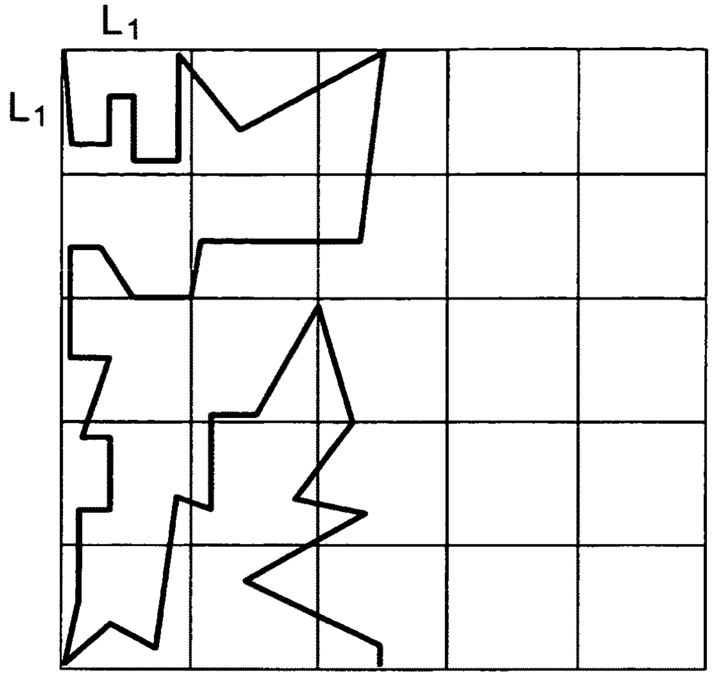
Figure 4:
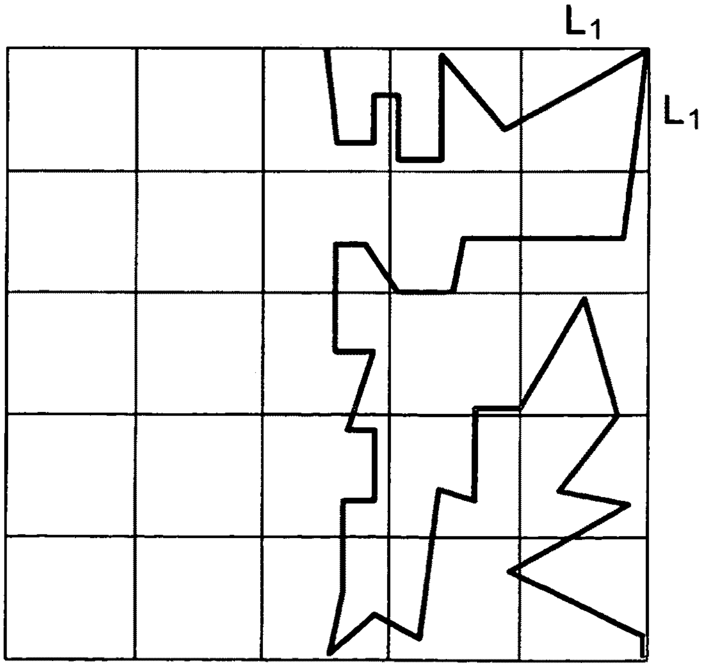

FIG. 4—Example of how to calculate the box counting dimension using a grid of substantially square cells.

Figure 5:
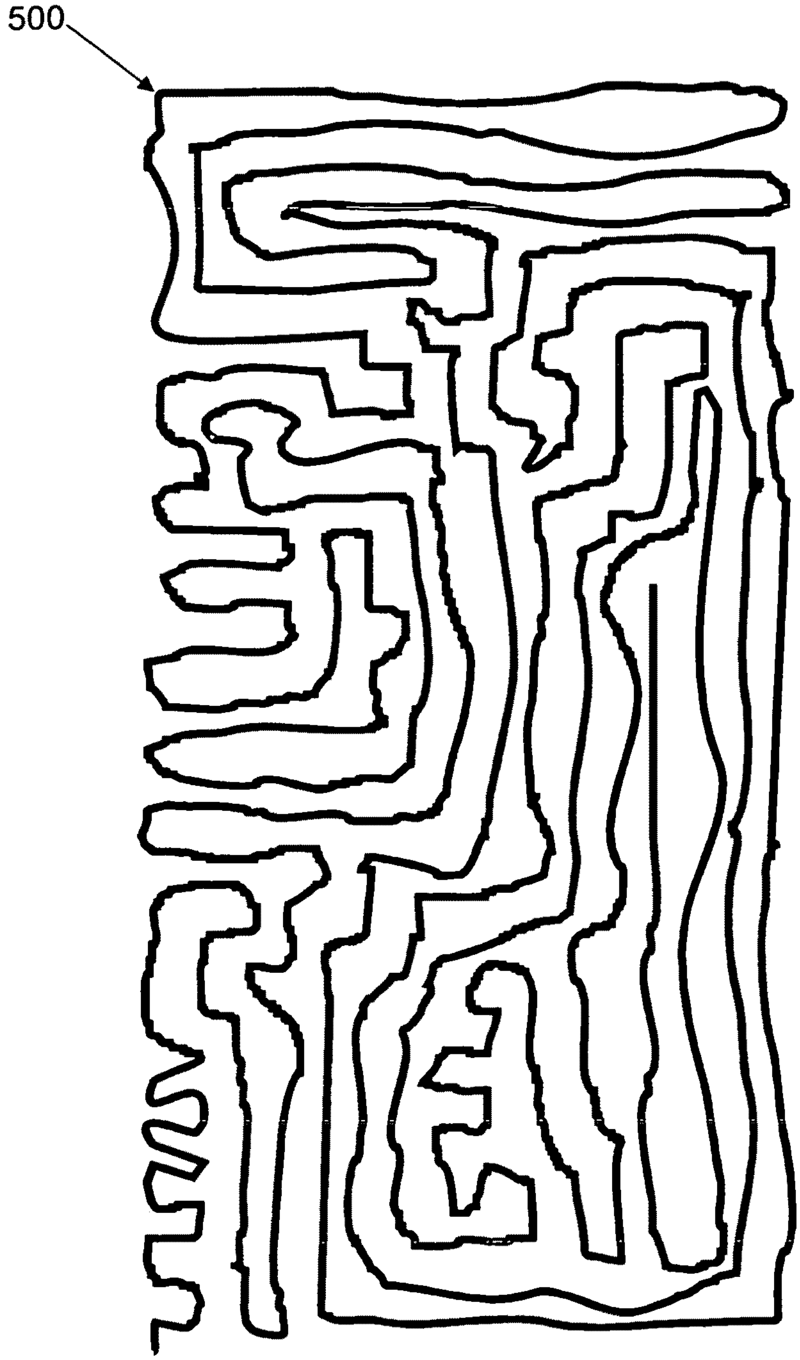

FIG. 5—Example of a curve featuring a grid-dimension larger than 1, referred to herein as a grid-dimension curve.

Figure 6:
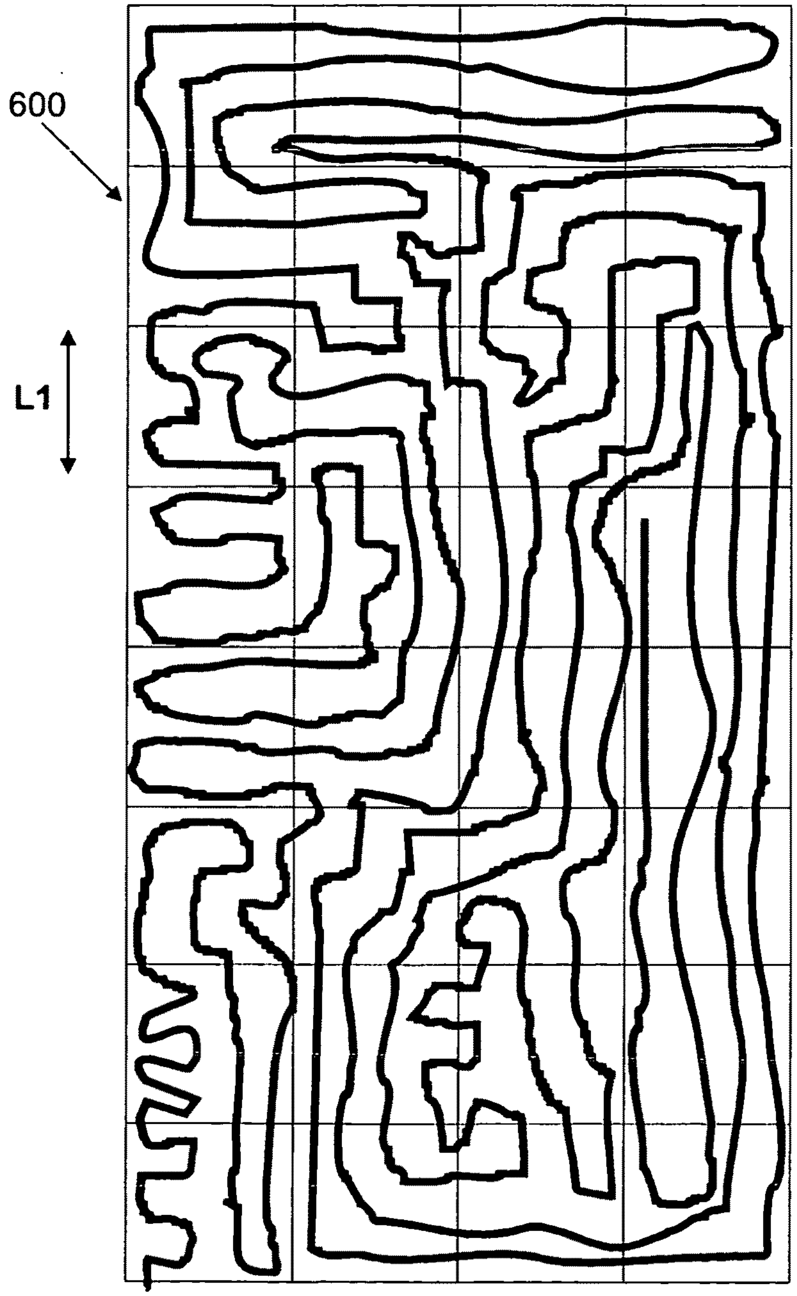

FIG. 6—The curve of FIG. 5 in the 32-cell grid, wherein the curve crosses all 32 cells and therefore N1=32.

Figure 7:
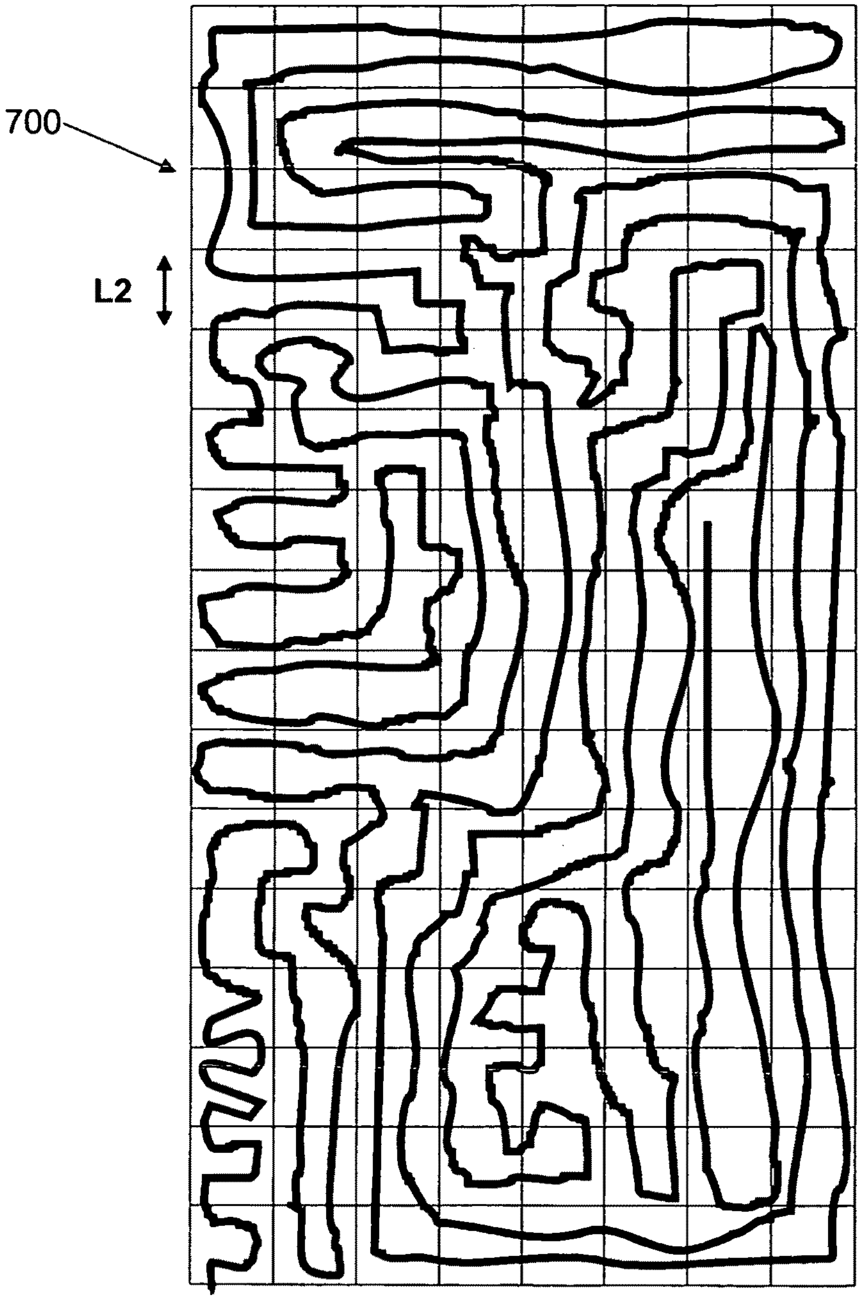

FIG. 7—The curve of FIG. 5 in a 128-cell grid, wherein the curve crosses all 128 cells and therefore N2=128.

Figure 8:
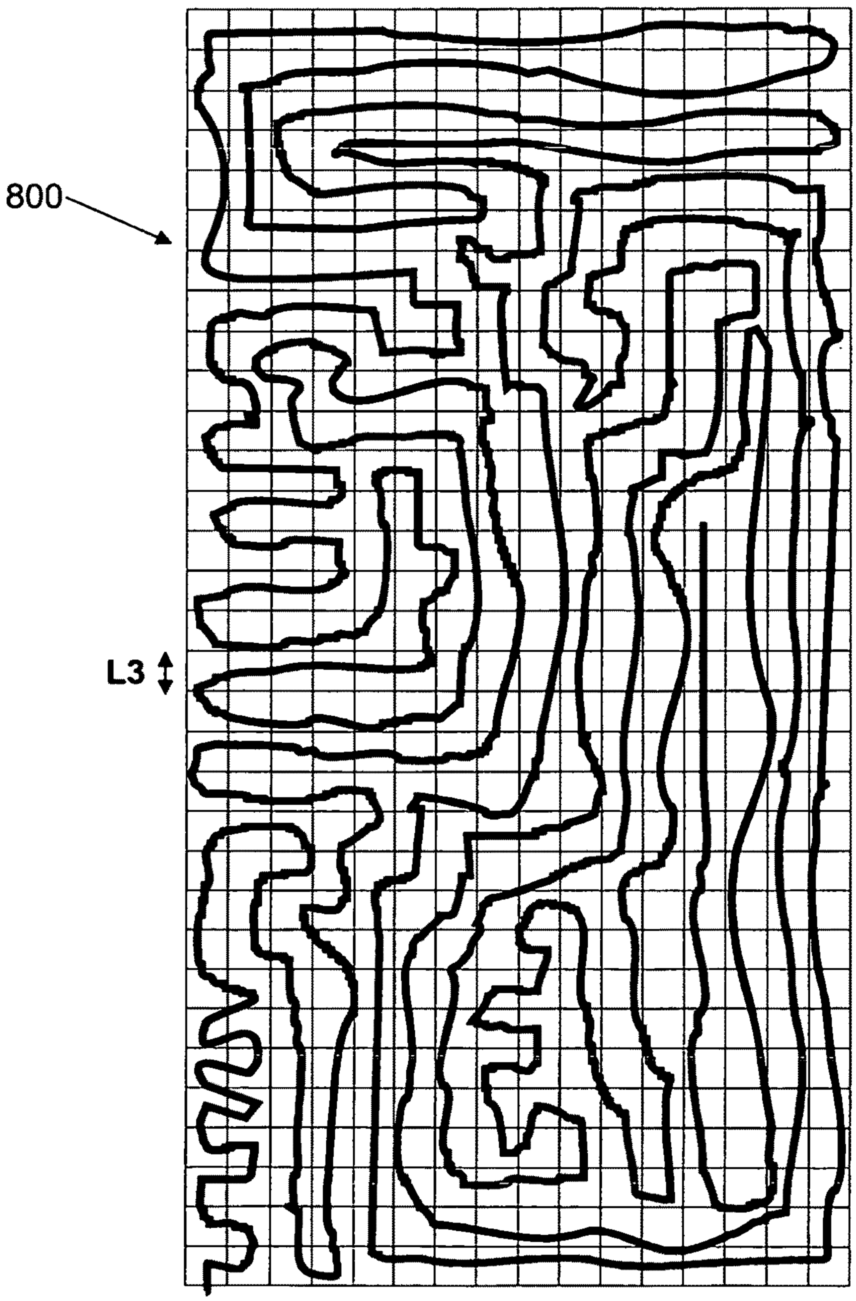

FIG. 8—The curve of FIG. 5 in a 512-cell grid, wherein the curve crosses at least one point of 509 cells.

Figure 9:
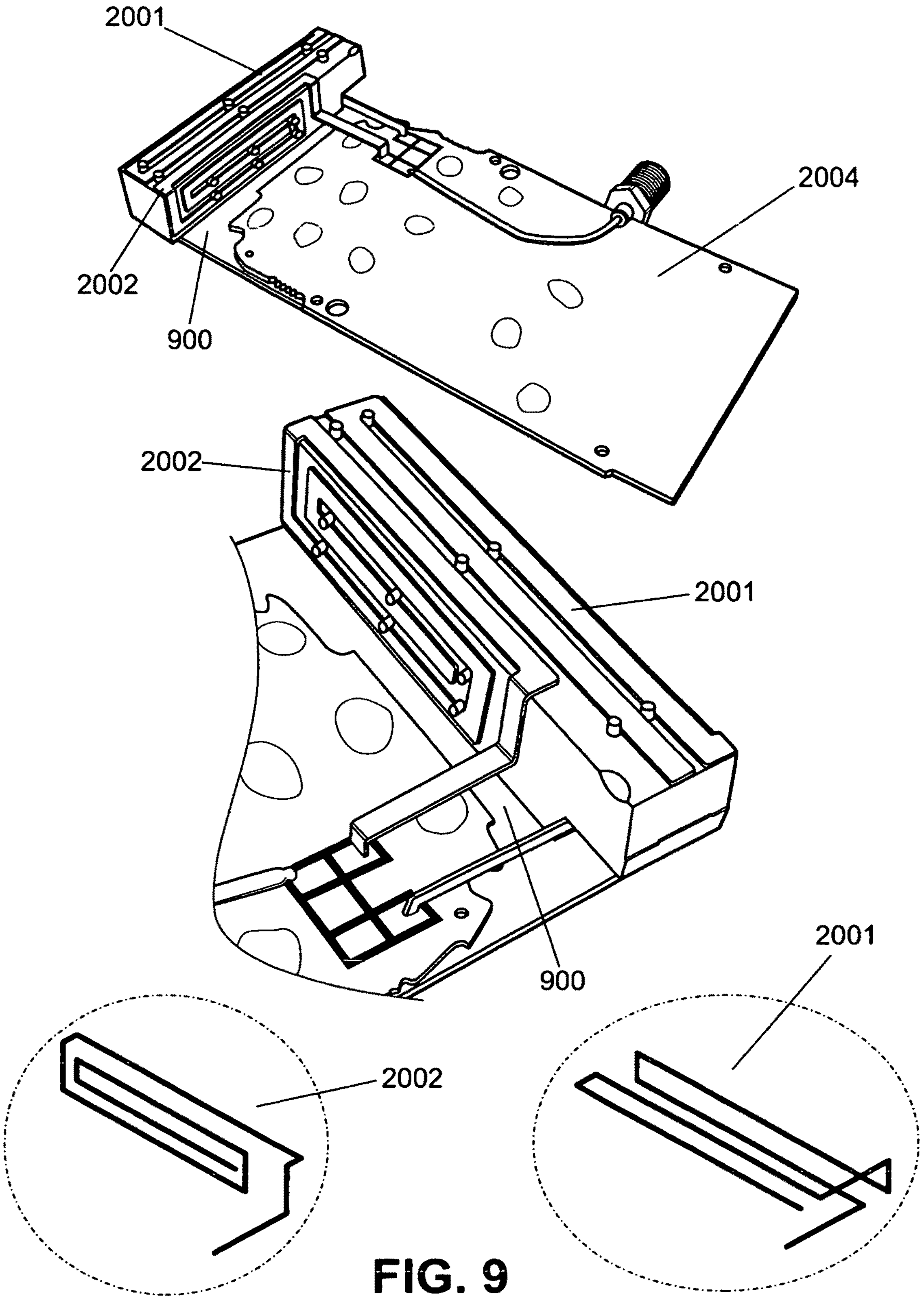

FIG. 9—Perspective view of an antenna system comprising a ground plane and two antenna elements and detailed perspective view of the two antenna elements.

Figure 10A:
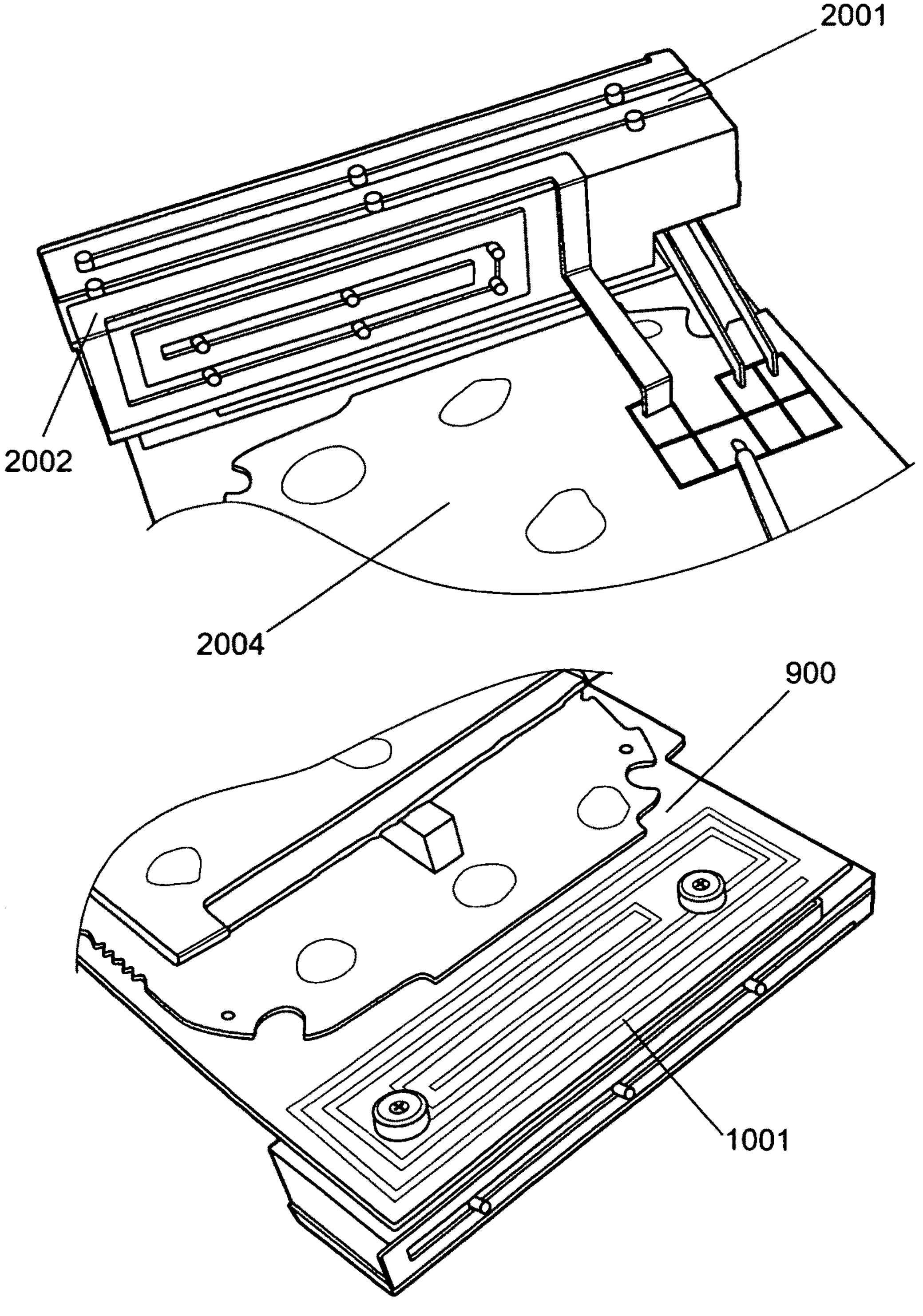

FIG. 10A—Perspective top view and perspective bottom view of an antenna system comprising a ground plane and three antenna elements. Two antenna elements can be seen in the top view and the third antenna element can be seen in the bottom view.

Figure 10B:
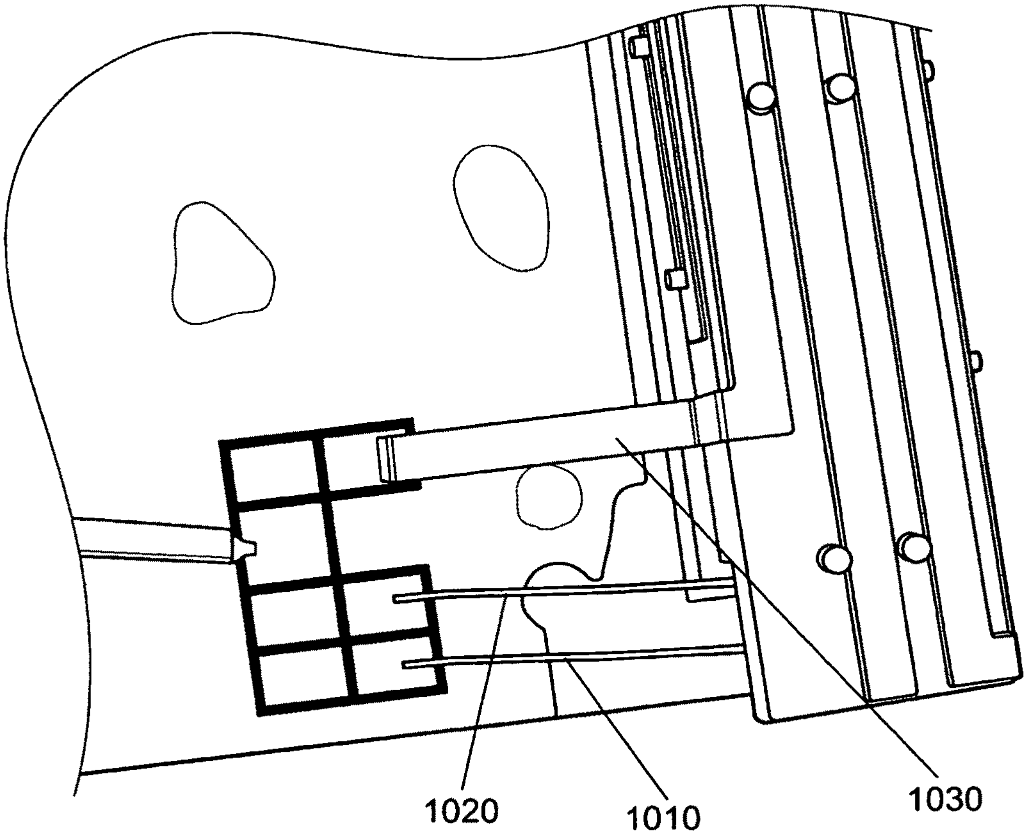

FIG. 10B—shows the feeding means for the three antenna elements of the antenna system of FIG. 10A.

Figure 11:
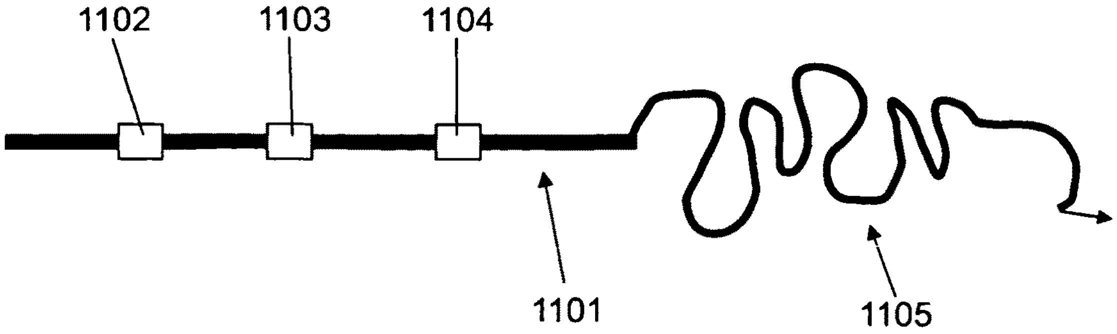

FIG. 11—shows an arrangement for tuning one or more of the antenna elements.

Figure 12:
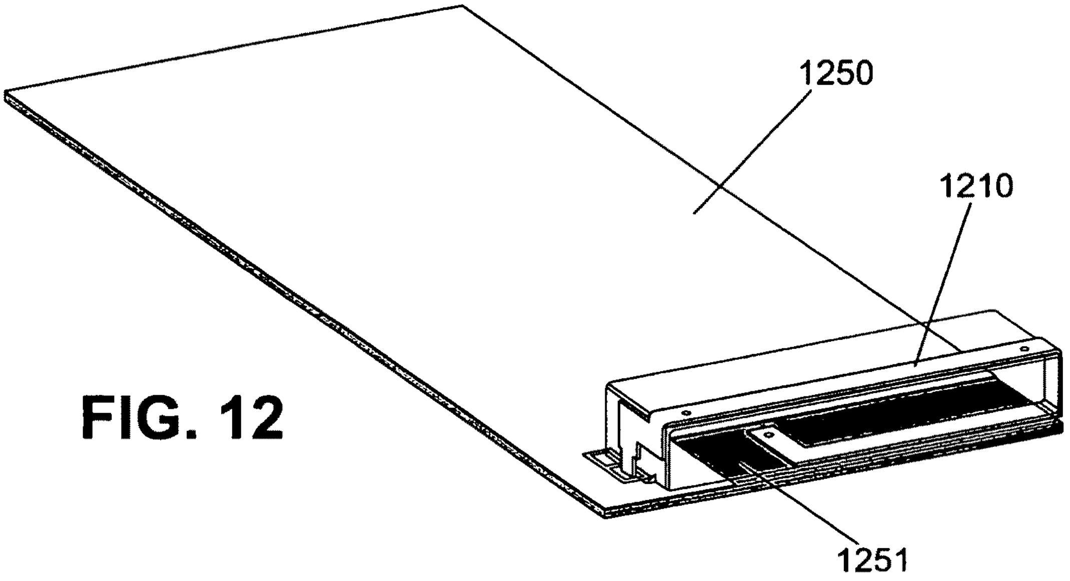

FIG. 12—is a schematic perspective view of an arrangement including a non-resonant antenna mounted in correspondence with an area in which the ground-plane has been removed.

Figure 13:
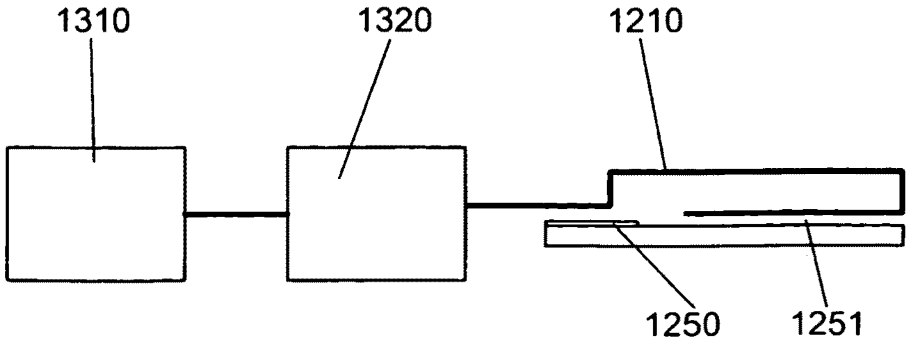

FIG. 13—schematically illustrates some components of a circuit including a non-resonant antenna.

Figure 14:
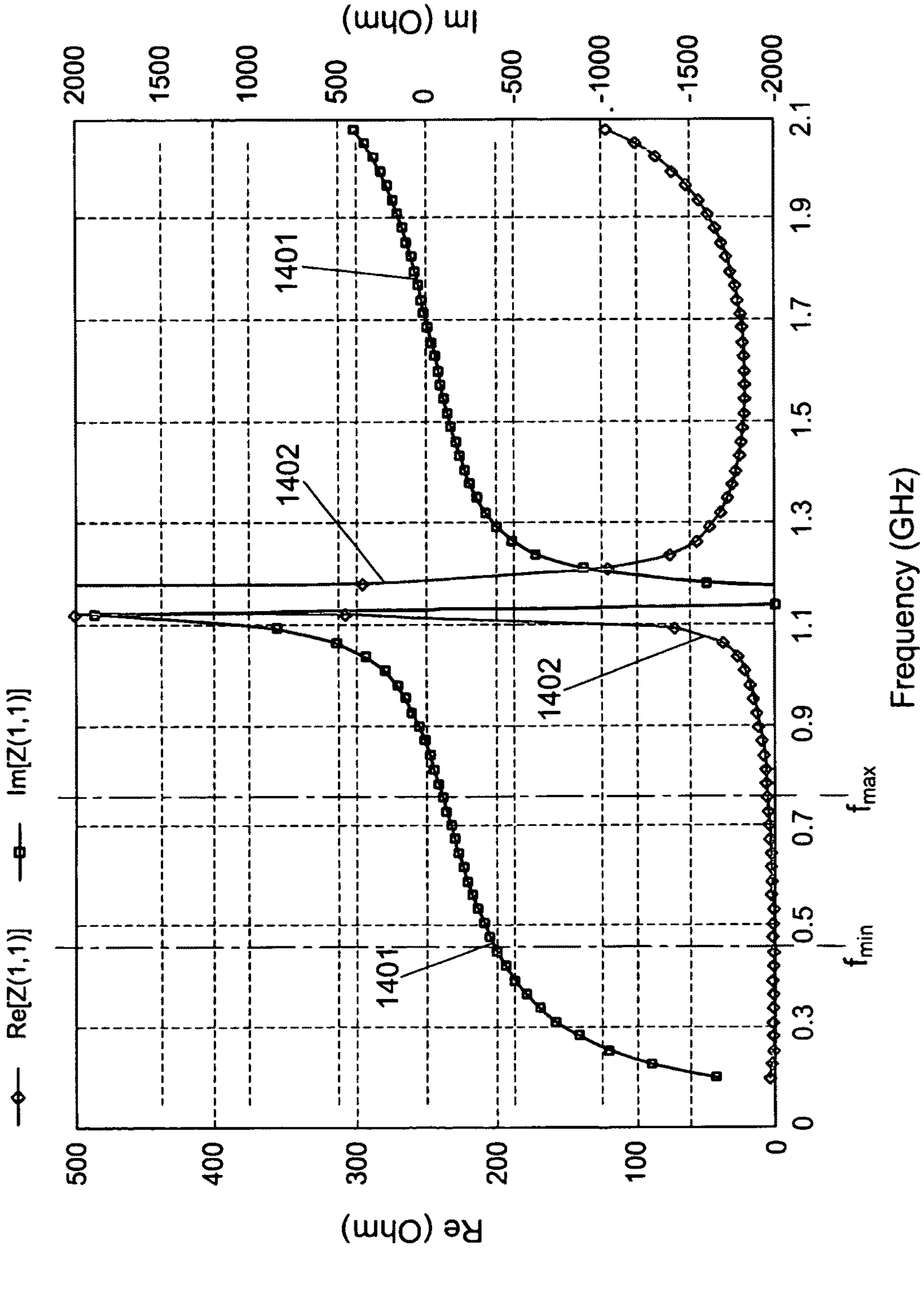

FIG. 14—shows an impedance diagram schematically illustrating how the real and imaginary parts of the input impedance of the antenna vary according to the frequency.

Figure 15A:
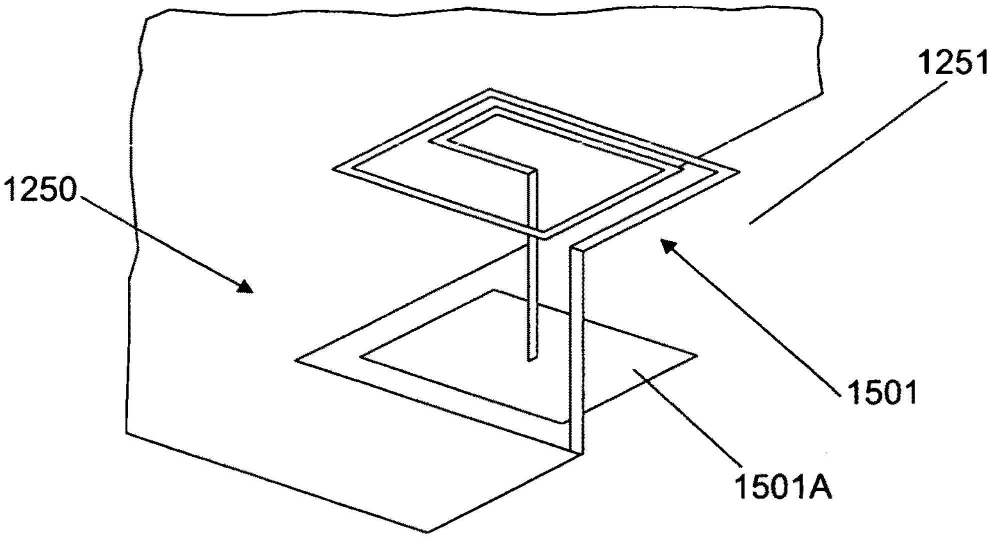
Figure 15A:
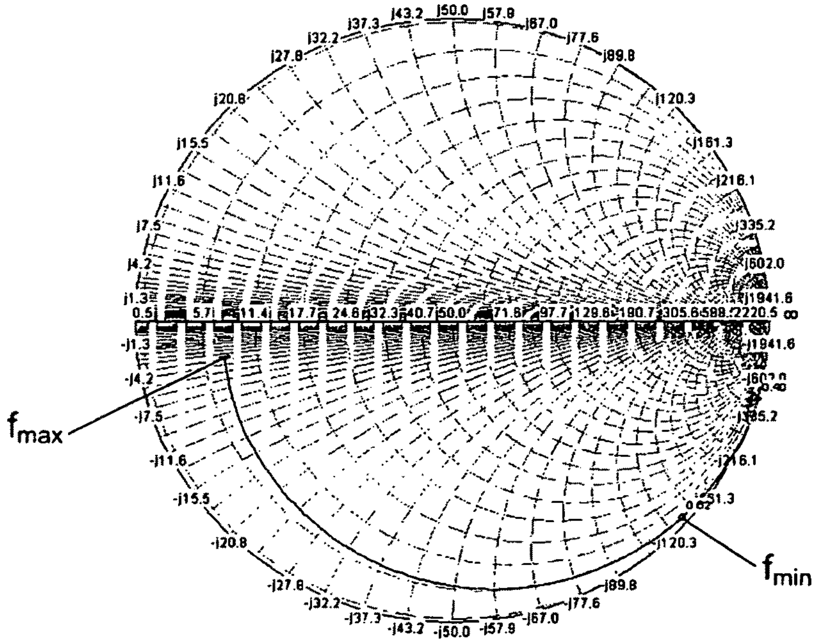
Figure 15B:
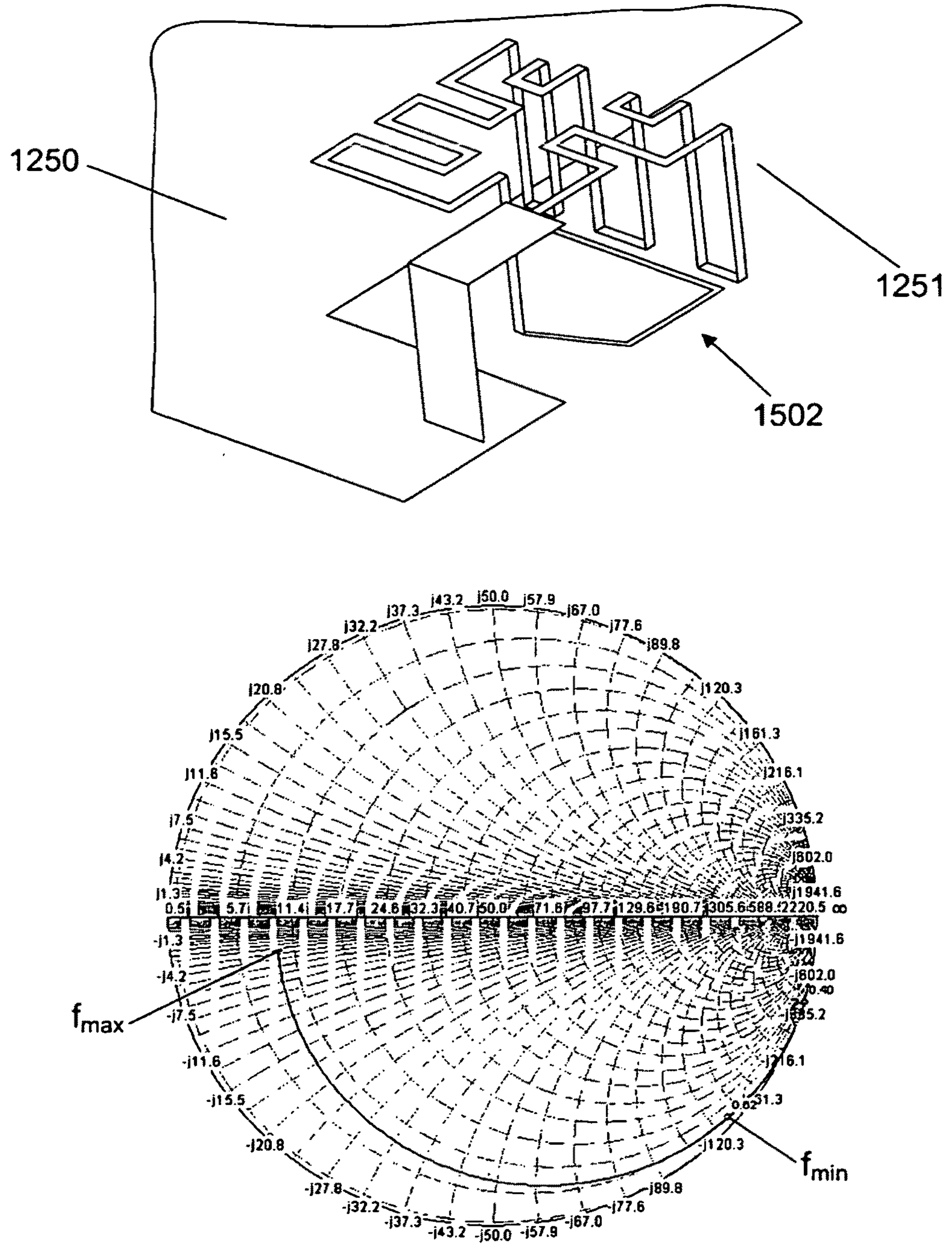
Figure 15C:
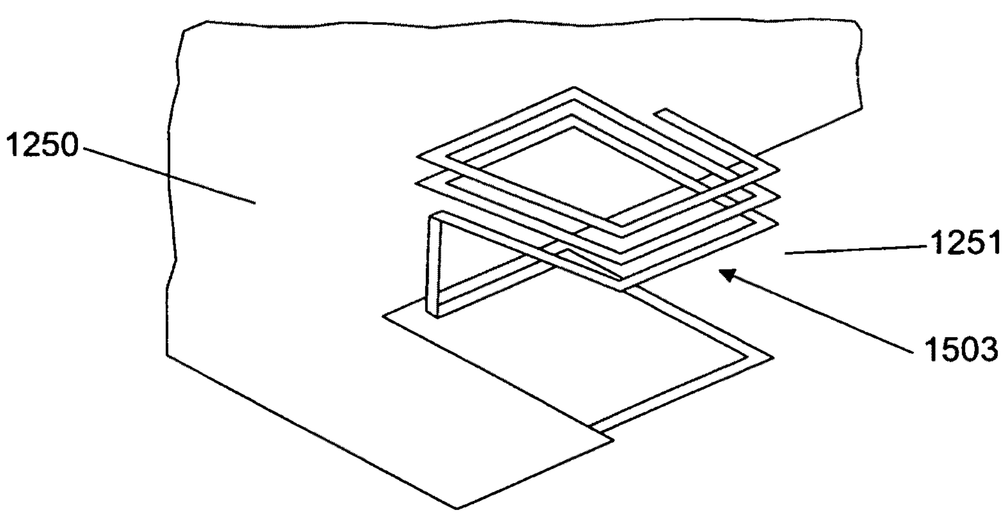
Figure 15C:
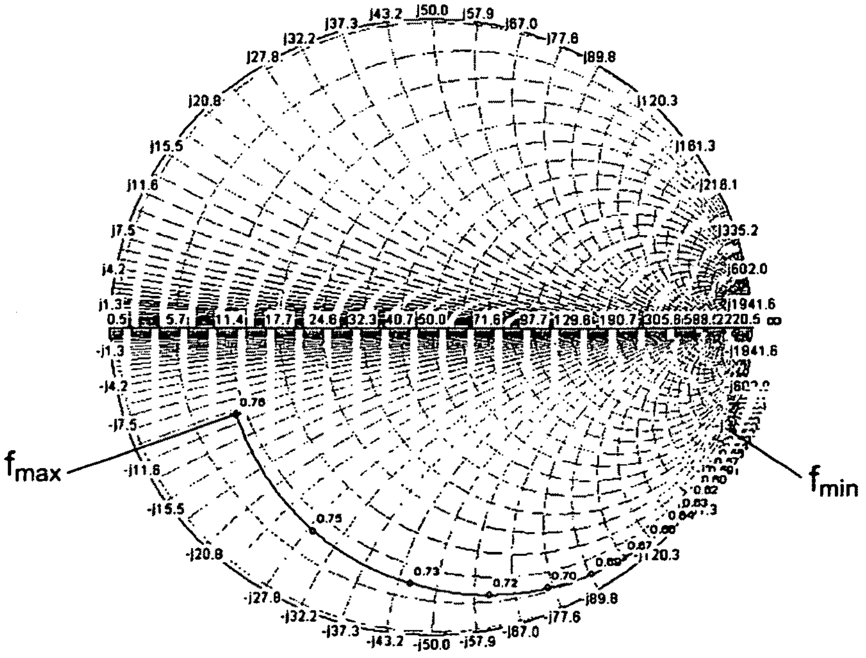

FIGS. 15A-15C—show some alternative non-resonant antenna designs, as well as their corresponding Smith charts.

Figure 15D:
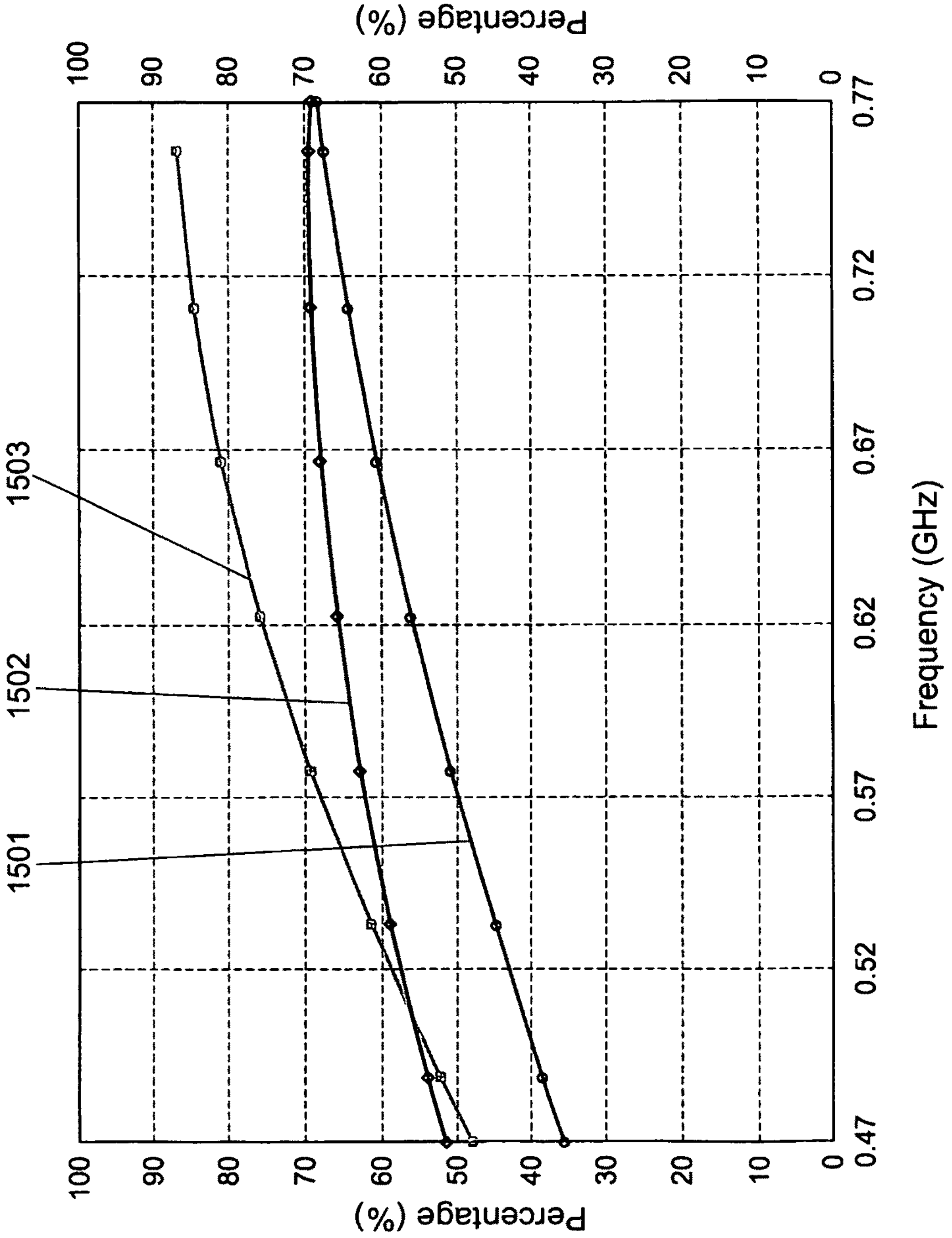

FIG. 15D—illustrates a radiation efficiency vs. frequency diagram for the antennas of FIGS. 15A-15C.

Figure 16:
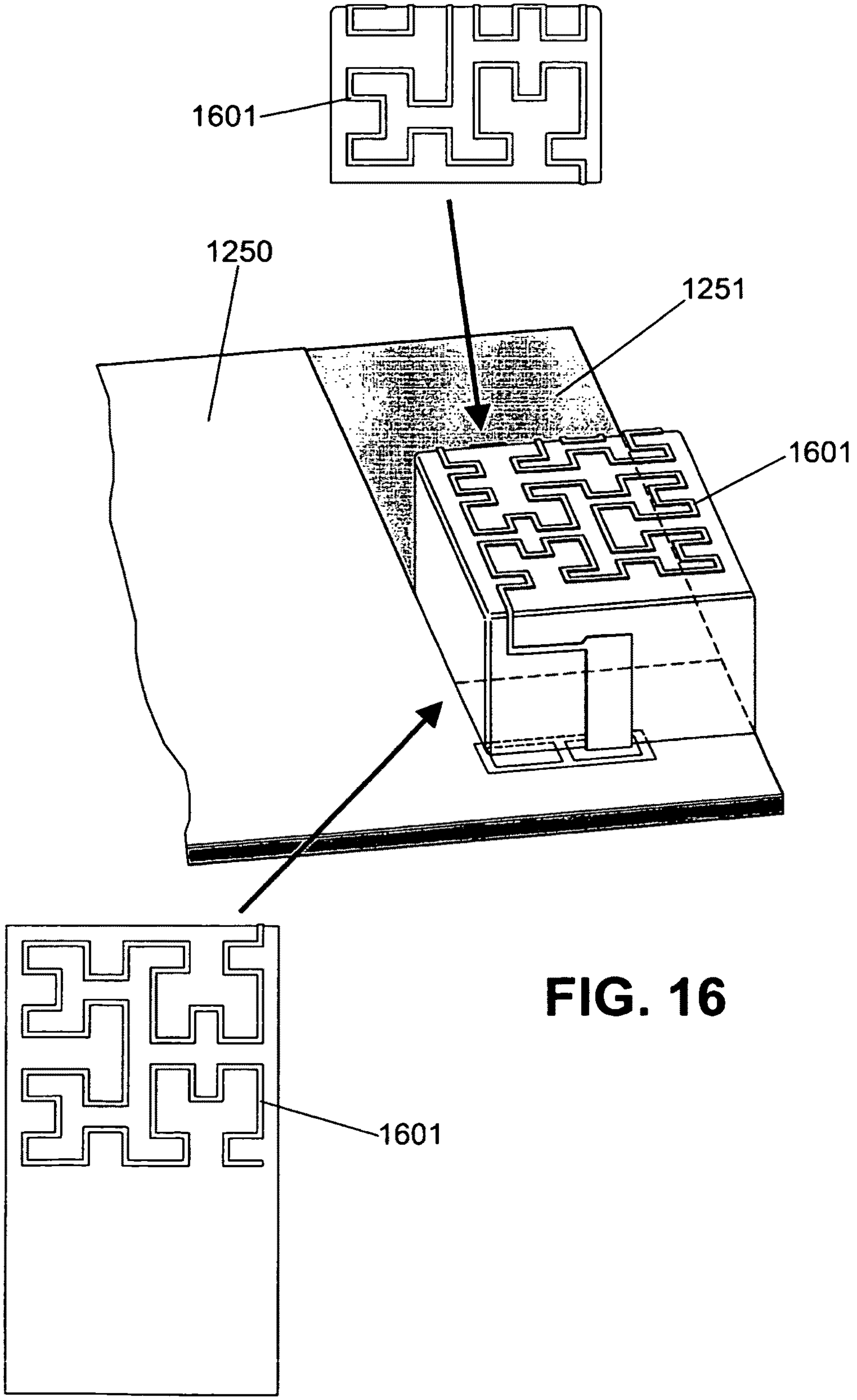

FIG. 16—illustrates an alternative antenna design, wherein an antenna element 1601 is substantially shaped in accordance with the Hilbert curve.

Figure 17:
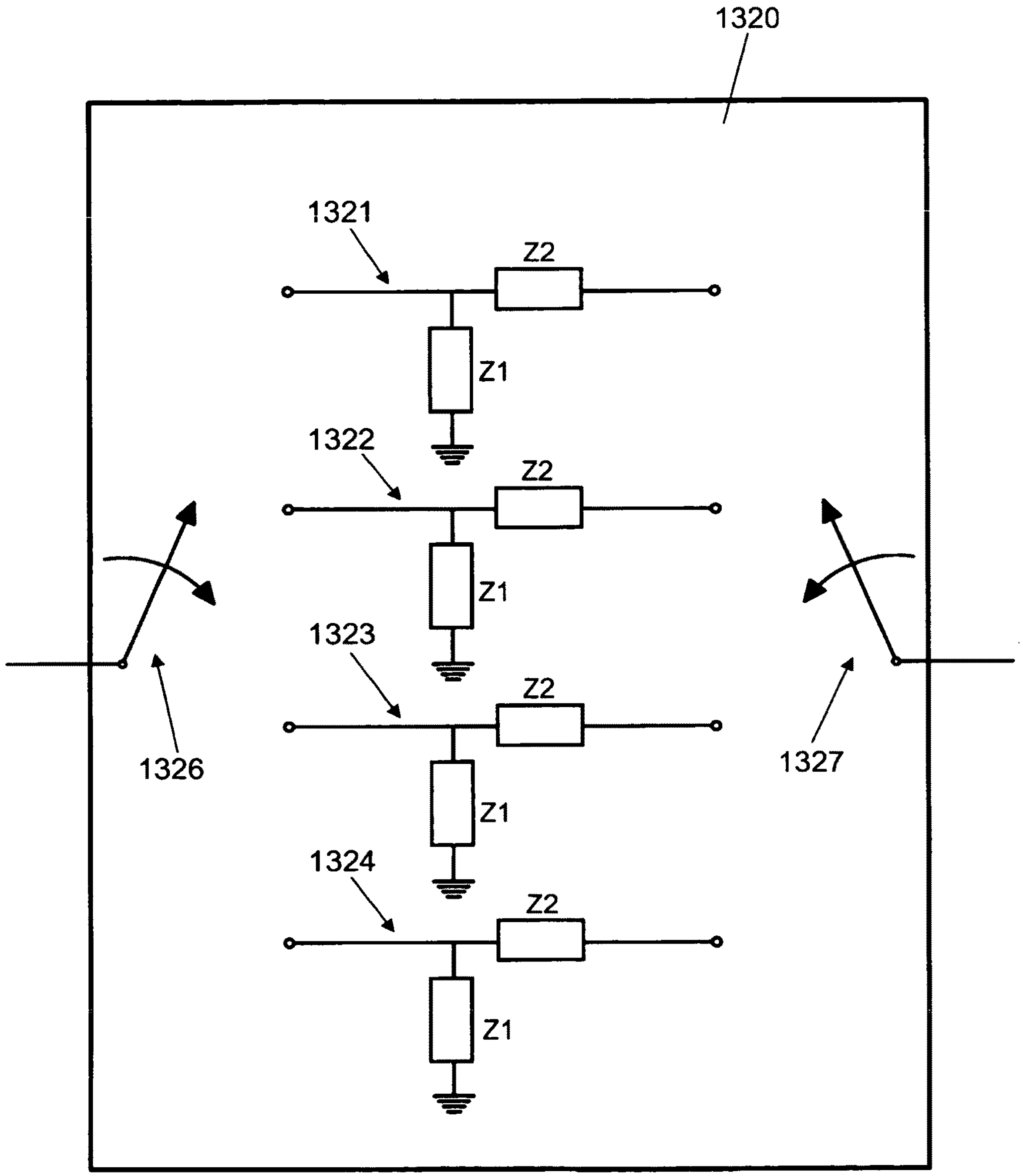

FIG. 17—illustrates how the "at least one" matching network can comprise a plurality of matching networks.

Figure 18:
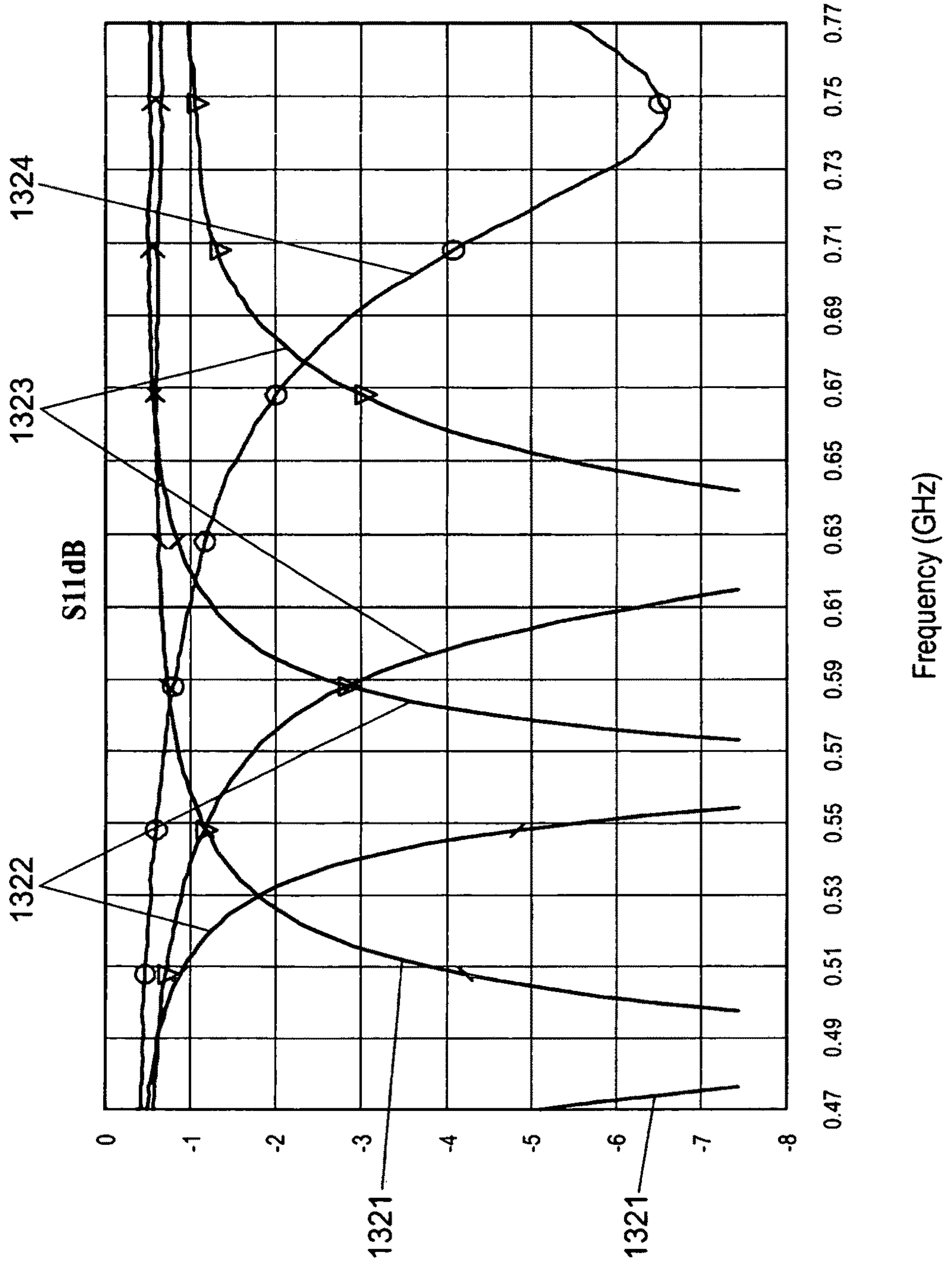

FIG. 18—illustrates the simulated frequency response of an antenna system based on a Hilbert antenna substantially as illustrated in FIG. 16, for four different matching networks substantially as illustrated in FIG. 17.

Figure 19A:
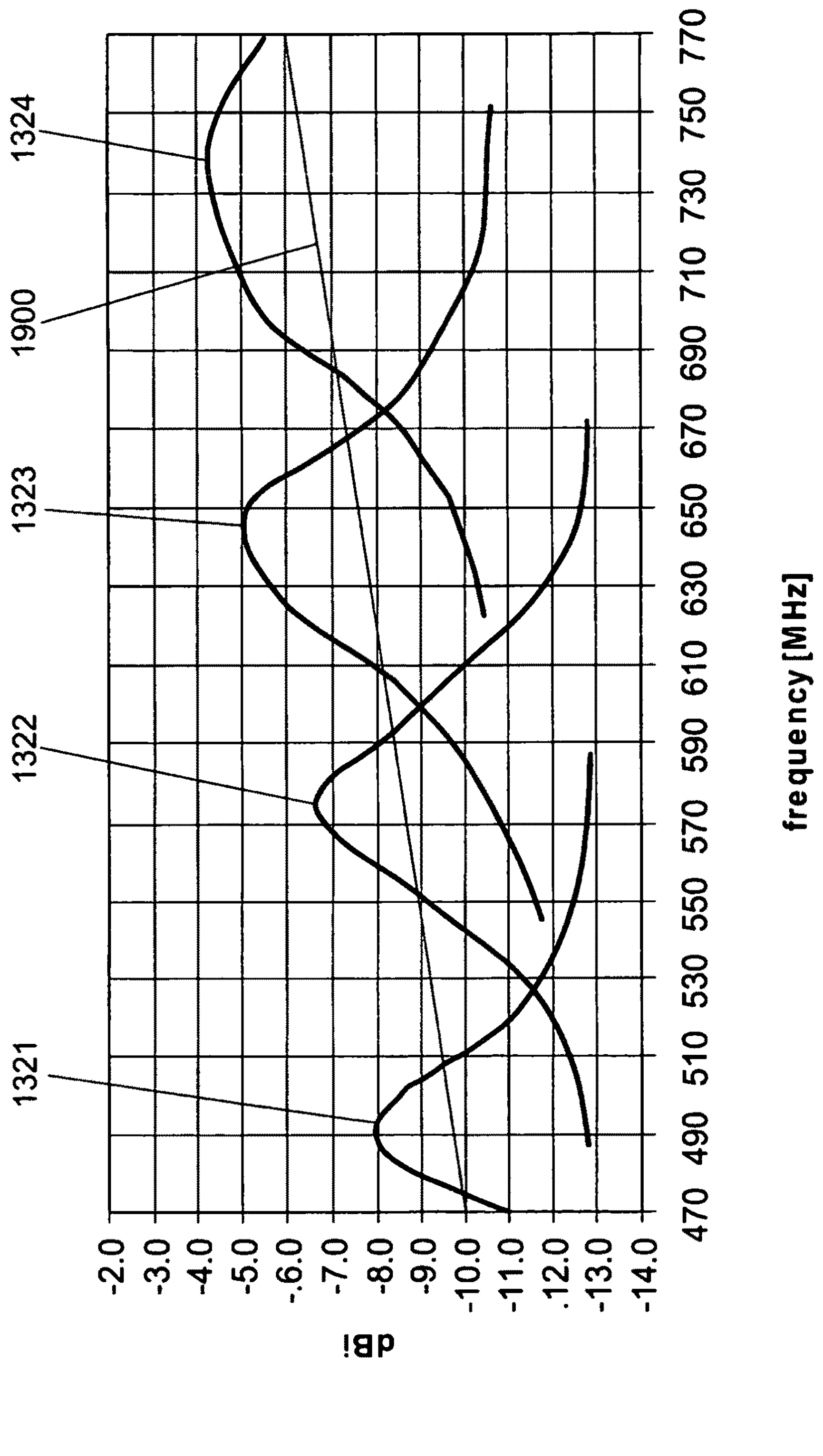
Figure 19B:
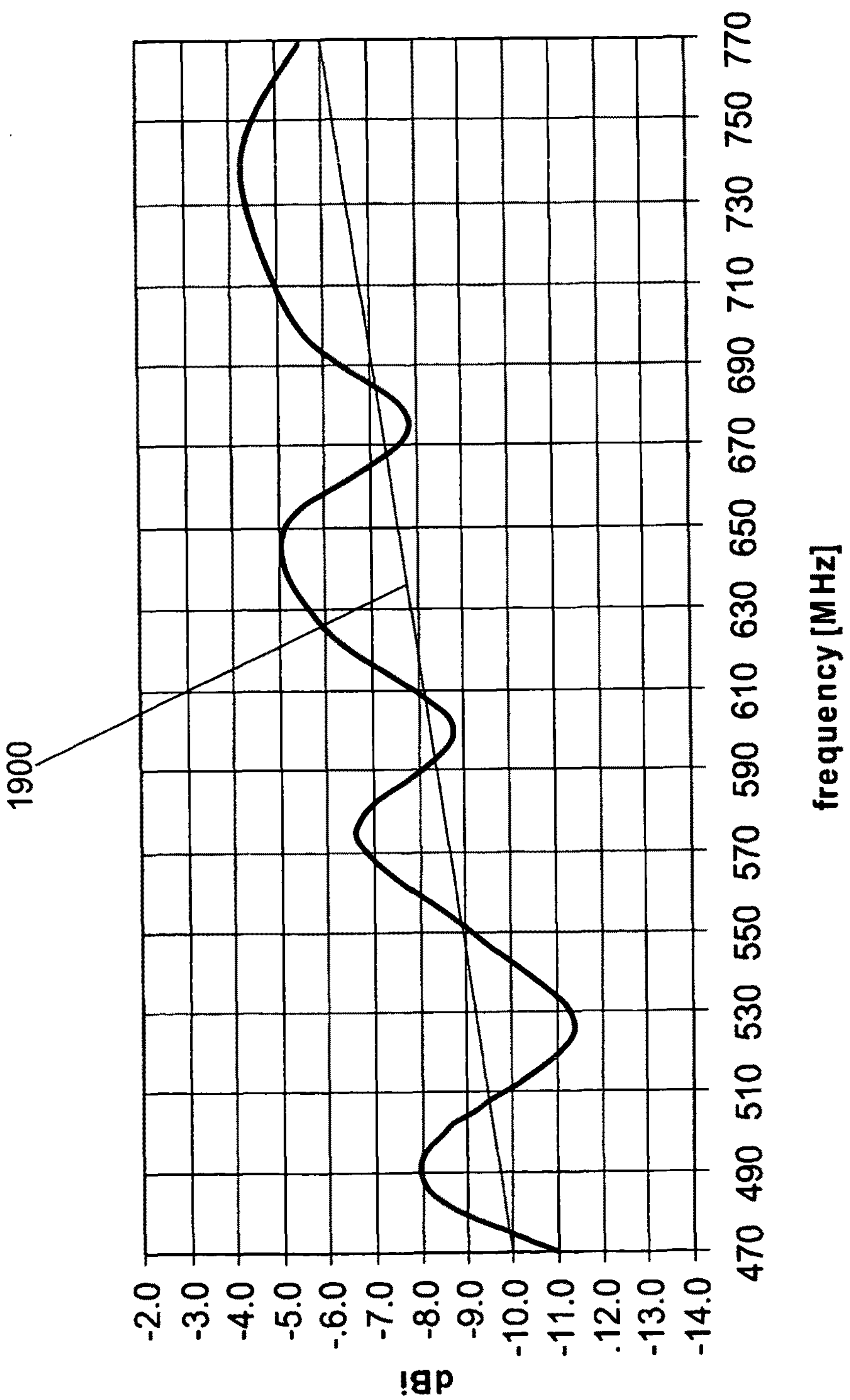

FIGS. 19A-19B—illustrates the gain using different matching networks.

Figure 20A:
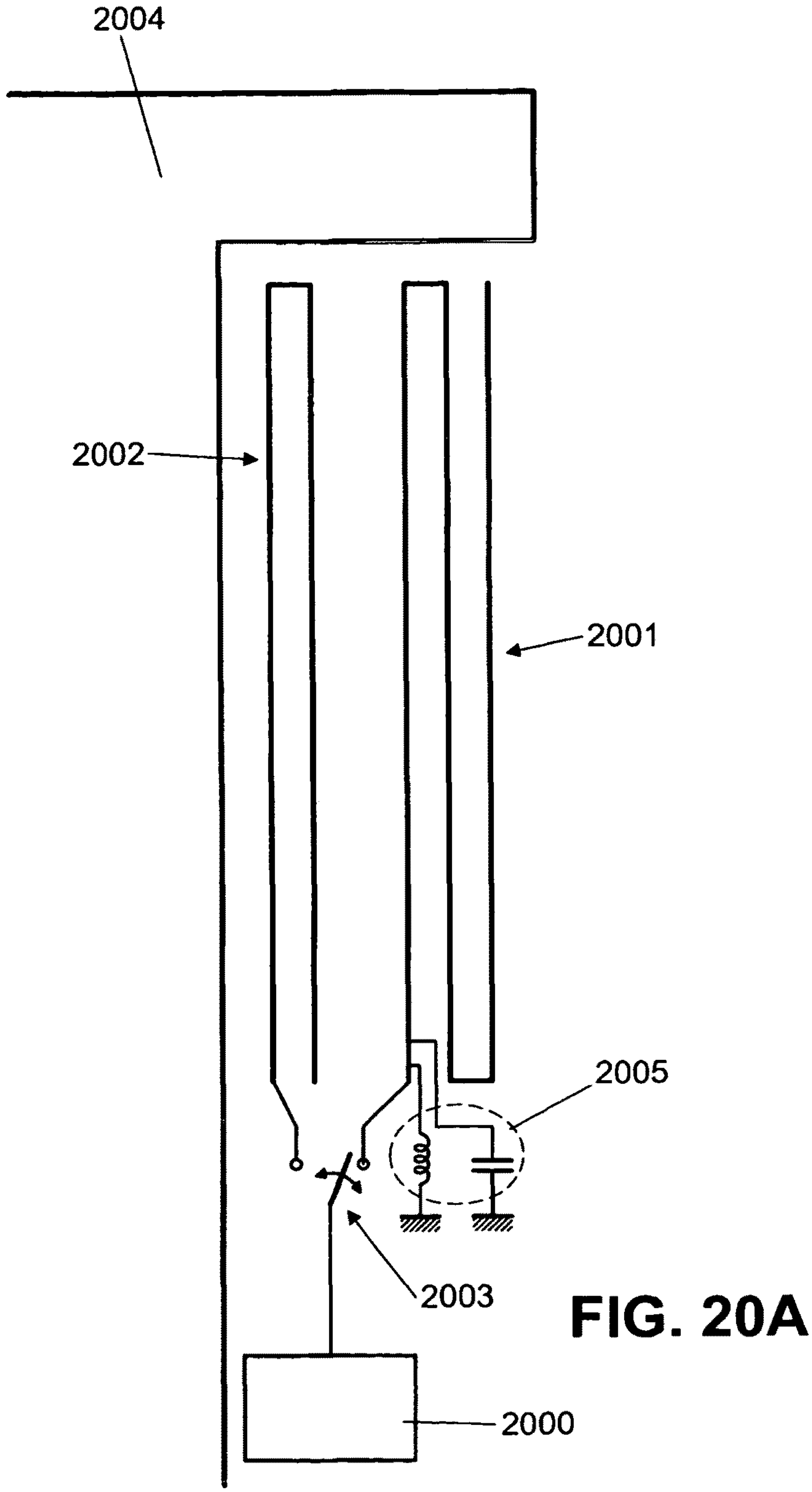
Figure 20B:
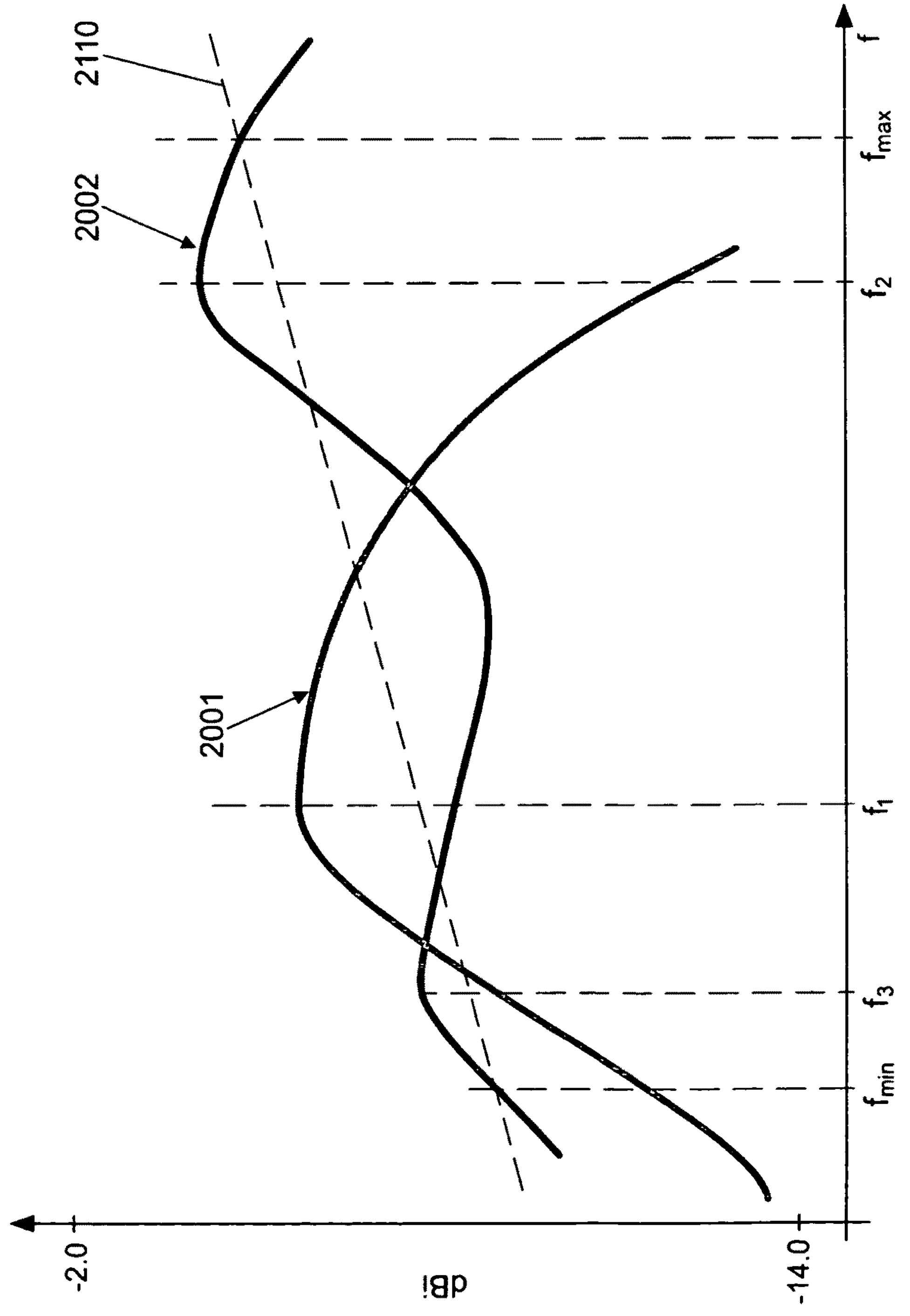

FIGS. 20A-20B—schematically illustrates an arrangement including two antenna elements tuned to different central frequencies, and the corresponding gain curves for said antenna elements, including local maxima produced due to parasitic effects, respectively.

Figure 21A:
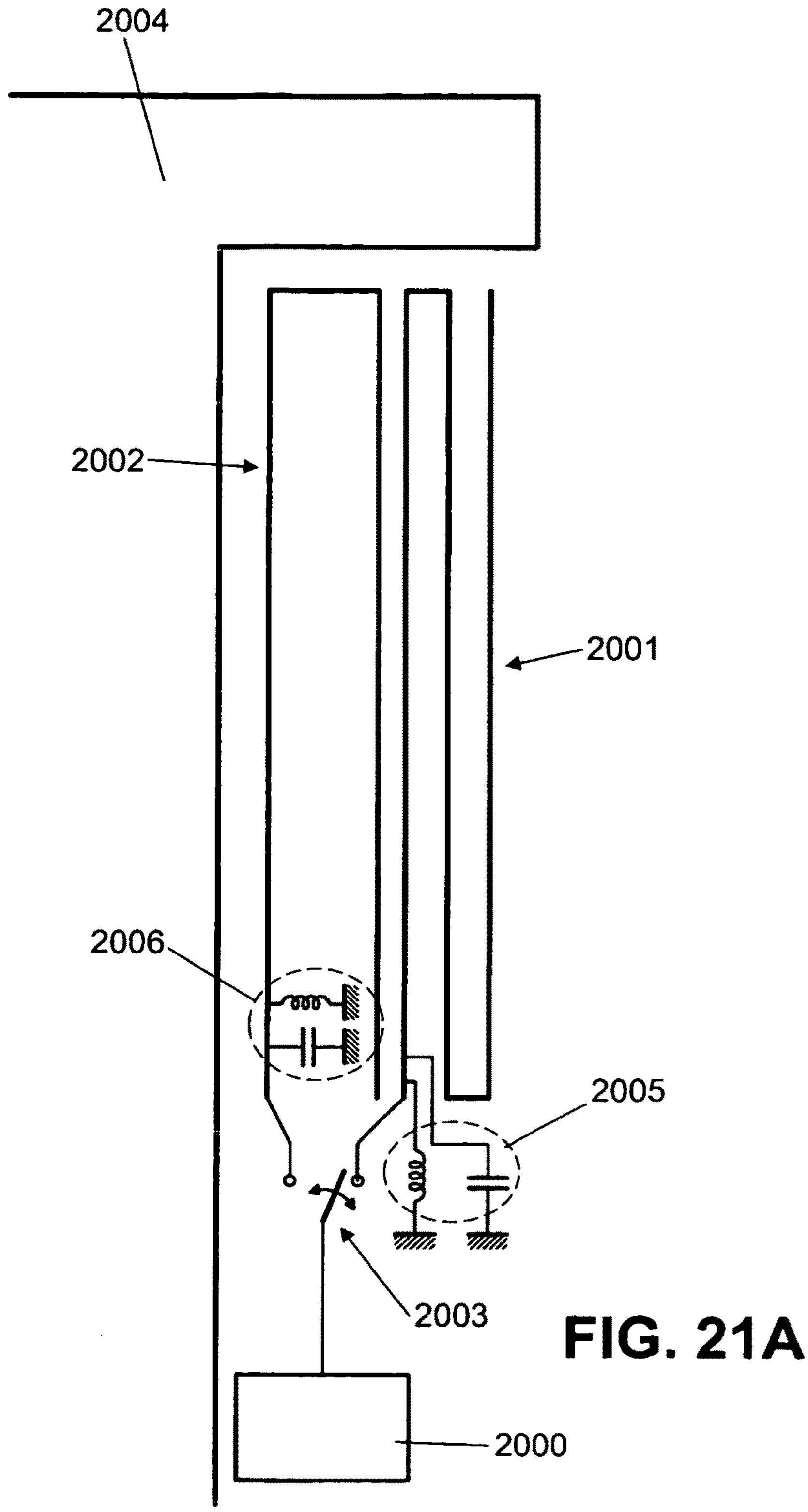
Figure 21B:
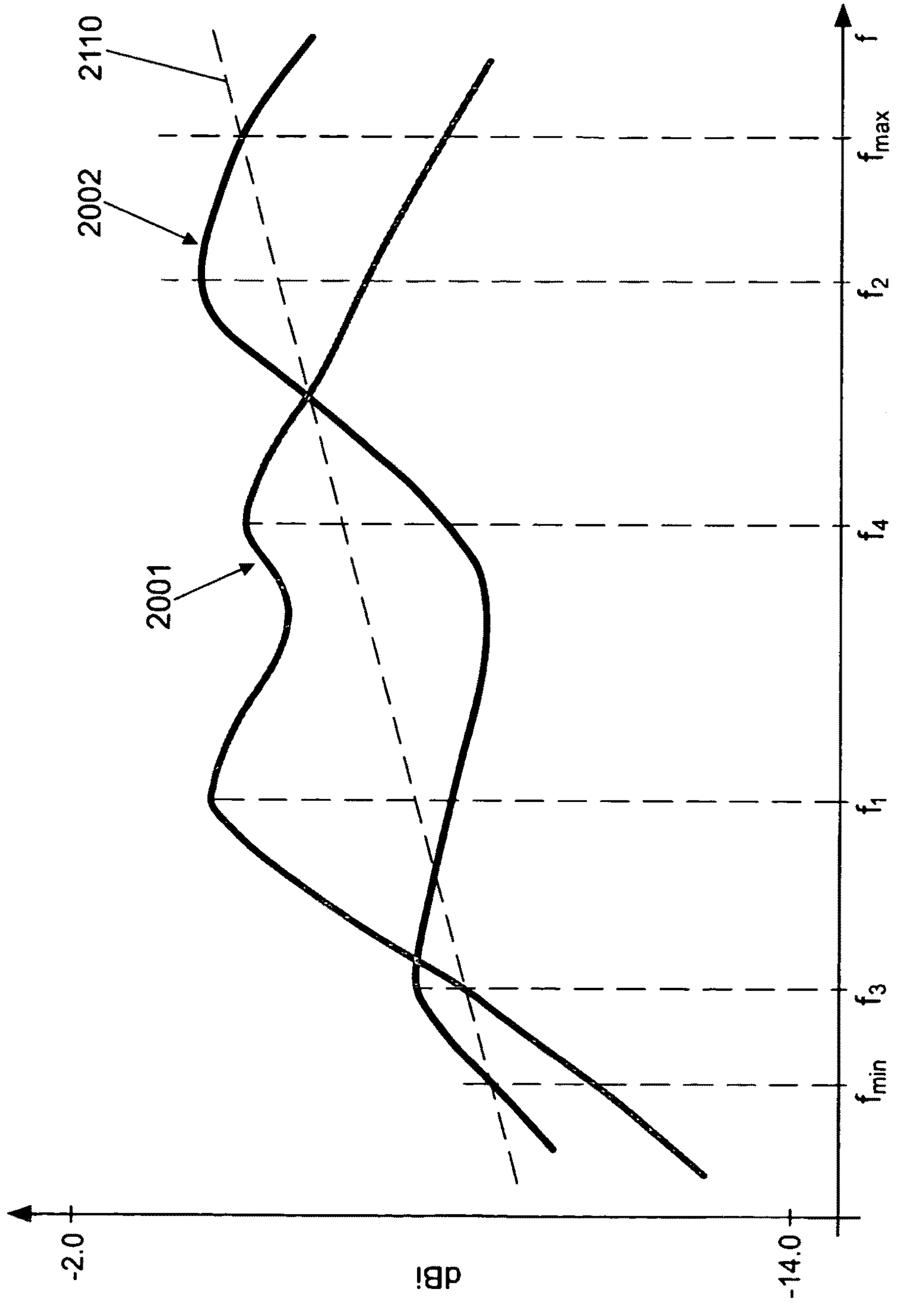

FIGS. 21A-21B—schematically illustrate the analogous aspects of an alternative arrangement, FIGS. 22A-22H—schematically illustrates a comparison of two different ways of interconnecting two ground-plane portions, according to prior art and according to the invention, respectively, as well as the computed current distribution when a non-resonant antenna is used.

Figure 23A:
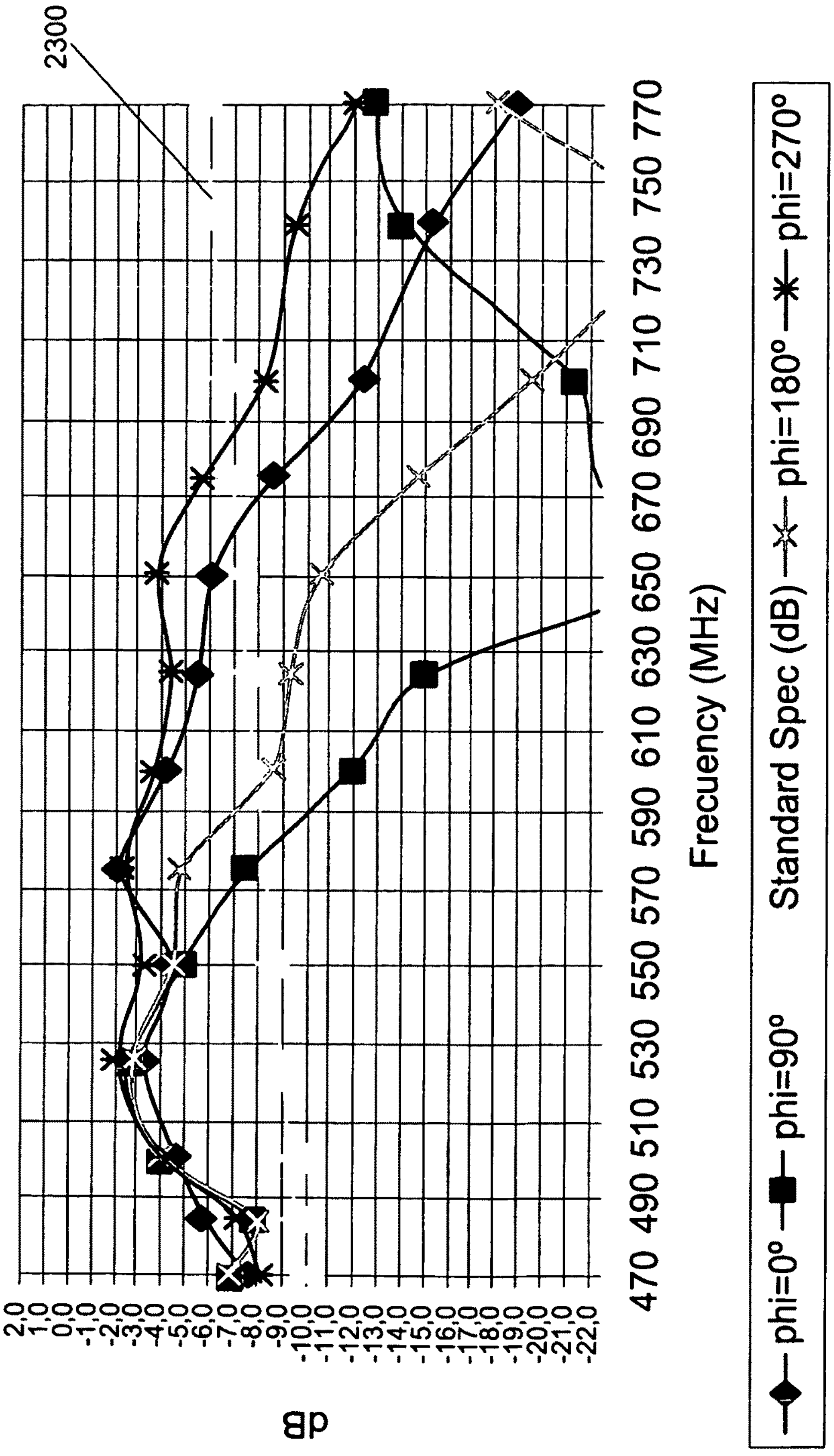
Figure 23B:
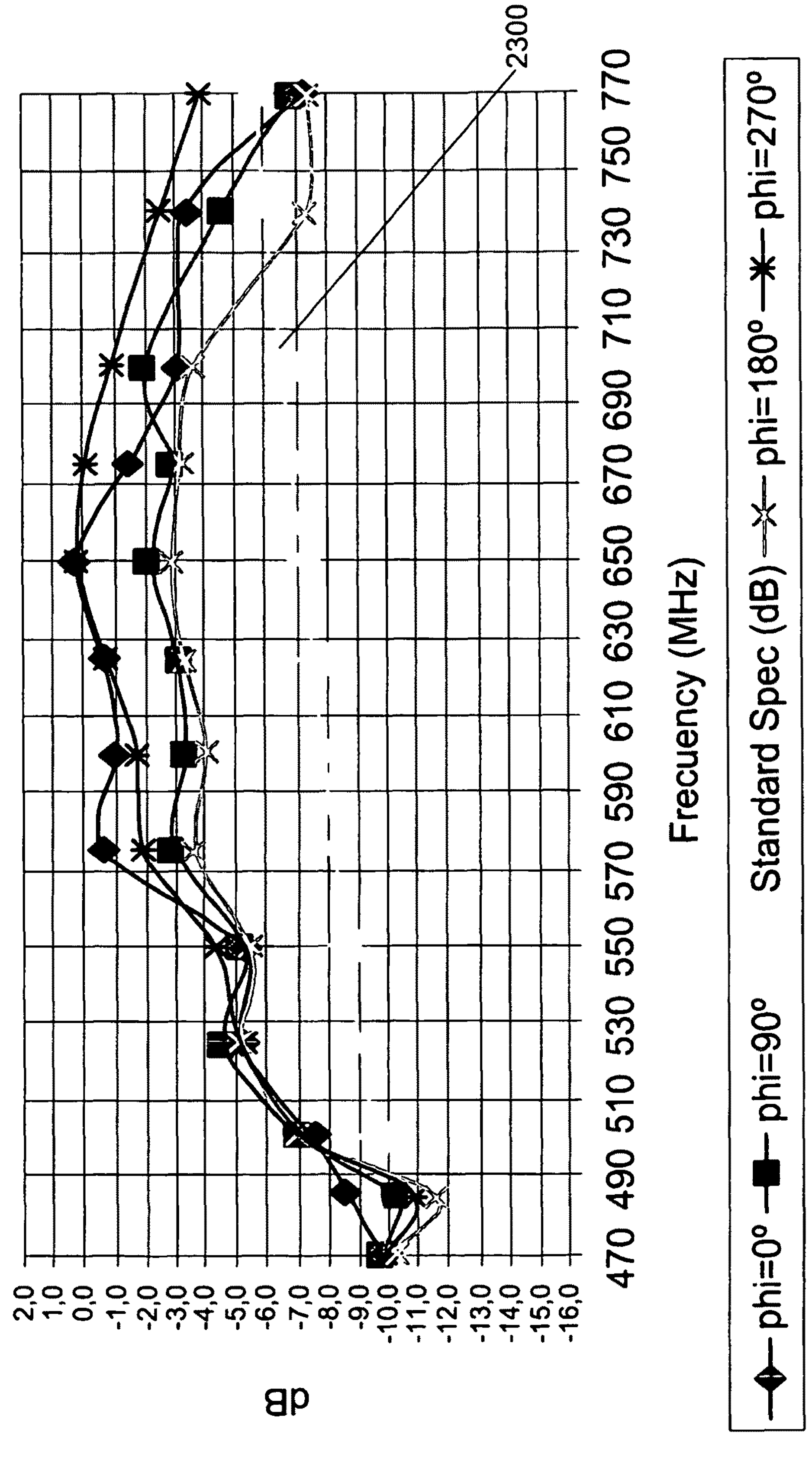

FIG. 23A-23B—schematically illustrate the gain curves at the horizontal plane when using one and two strips for interconnecting the two ground-plane portions, respectively.

DESCRIPTION OF THE PREFERRED EMBODIMENTS

FIG. 12 illustrates one example of a non-resonant antenna element, arranged on a ground plane 1250 constituted by a conductive layer of a PCB. The conductive layer has been removed in correspondence with a substantial area 1251 corresponding to the antenna element's footprint, that is, to the projection of the antenna element on the PCB. This has been found to improve gain. The ground plane has a width not larger than 45 mm.

FIG. 13 schematically illustrates some relevant components of the device, namely, the antenna 1210, the ground plane 1250 (with the portion 1251 removed under most of the antenna element 1210), communication circuitry 1310 for processing a signal received through said antenna element, and a matching network 1320 operatively arranged between said antenna element and said communication circuitry.

FIG. 14 is an impedance diagram schematically illustrating how the real and imaginary parts of the input impedance of the antenna element vary according to the frequency. In FIG. 14, a frequency interval having a lower limit $f_{min}$ of approximately 470 MHz and an upper limit $f_{max}$ of approximately 770 Mhz has been illustrated (implying a relative bandwidth of approximately 48%). It can be observed that, as the antenna has no resonant frequency within this frequency band, and as the antenna has been chosen so that the rapid changes in the imaginary (reactive) part 1401 of the input impedance occur at frequencies remote from said frequency band (basically, for frequencies lower than 400 MHz and higher than 800 MHz), the input impedance of the antenna is relatively constant (both in terms of resistance 1402 and reactance 1401) within the frequency band. Thus, it is possible to obtain an adequate gain by means of high matching quality (that is, with low miss match losses), with only one matching circuit or with a limited amount of matching circuits: the substantially constant input impedance of the antenna, throughout the relevant frequency band, makes this possible.

FIG. 15A-15C illustrate some alternative non-resonant antenna designs, as well as their corresponding Smith charts. FIG. 15A illustrates a loaded antenna 1501 (the tip of which is connected to a metal surface constituting a capacitive load 1501A), FIG. 15B illustrates a meandering antenna 1502, and FIG. 15C illustrates a rolling antenna 1503. The Smith charts illustrate the real and imaginary parts of the input impedance of the corresponding antenna within the relevant frequency band ($f_{min}$, $f_{max}$ being approximately 470 MHz and 770 MHz, respectively). FIG. 15D illustrates a radiation efficiency vs. frequency diagram for these antennas, the rolling antenna appearing to provide the best efficiency.

Although the illustrated examples relate to cases in which the input impedance of the antenna is capacitive within the relevant frequency band (that is, the imaginary part of the input impedance is negative for said frequency band), the invention could also be implemented with an inductive input impedance of the antenna (that is, featuring a positive imaginary part of the input impedance for the relevant frequency band).

It has been found that when trying to reduce the size of a non-resonant antenna while substantially maintaining the basic antenna shape, there is a reduction in efficiency, especially at low frequencies, for example, at frequencies close to the lower end of the above-mentioned 470-770 MHz band.

FIG. 16 illustrates an alternative antenna design, wherein the antenna 1601 is substantially shaped in accordance with the Hilbert curve. One or more of the antenna elements can be shaped as a space-filling curve, a box-counting curve or a grid curve.

FIG. 17 illustrates how the "at least one" matching network 1320 can comprise a plurality of matching networks, namely, four matching networks (1321-1324) arranged with switching means (1326, 1327) for selectively connecting one of said matching networks to the antenna, or, rather, between the antenna and the communication circuitry that is to receive and process the received signal. The device includes the necessary hardware and/or software for selectively setting the switch means in their appropriate states, so as to "activate" the corresponding matching network. Thus, a matching network can be chosen that is especially appropriate for a certain frequency band within the general bandwidth of the system, for example, for a frequency band corresponding to a certain television channel.

This can be useful in order to improve the received signal within a certain "sub-band". Thus, this arrangement can compensate a certain loss of efficiency of the antenna, and thus allow for further miniaturisation of the antenna, while maintaining the general performance of the antenna system above the minimum levels specified for a certain application, for example, for DVB-H services.

FIG. 18 illustrates the simulated frequency response of an antenna system based on a Hilbert curve substantially as illustrated in FIG. 16, for four different matching networks substantially as illustrated in FIG. 17, and with the following values chosen for the reactive elements Z1 and Z2 making up the respective matching networks:

Matching network 1321 (470-500 MHz): Z1=9.1 nH, Z2=36 nH

Matching network 1322 (550-590 MHz): Z1=6.2 nH, Z2=22 nH

Matching network 1323 (600-650 MHz): Z1=7.5 nH, Z2=15 nH

Matching network 1324 (720-770 MHz): Z1=8.7 nH, Z2=4.7 nH

FIG. 19A schematically illustrates the gain of the antenna system using the above matching networks, as well as a typical "standard specification" 1900 of the required gain for a DVB-H system. FIG. 19B schematically illustrates the total resulting gain of the antenna system, with an appropriate selection/switching of the matching networks, along the frequency band. It can be observed how the different matching networks can help to "lift" the gain over the minimum threshold for certain, relevant portions of the relevant frequency band. Thus, the use of a plurality of matching networks can help to further reduce the size of the non-resonant antenna, while maintaining a sufficient gain.

FIG. 20A illustrates how two antenna elements, that is, a first antenna element 2001 having a first electrical length and a second antenna element 2002 having a second electrical length (shorter than the first electrical length) are arranged to be selectively connected to a radio frequency communication circuitry 2000, by means of a switch 2003. In this embodiment, at least one matching network 2005 is provided, for connecting an antenna element (in this case, the first antenna element), to ground. The matching network comprises an inductance and a capacitance, arranged in parallel between the antenna element and ground. Also, a ground plane 2004 can be observed, which, however, in this case, is not present below the antenna elements. A first one of the antenna elements is tuned to a first central frequency, and the other antenna element is tuned to a second central frequency. Thus, it is possible to choose, for transmission or reception of a radio frequency signal, the antenna element that implies the best conditions (such as gain) at the relevant frequency. This can be helpful in order to assure an adequate gain over a wide frequency band, such as over the frequency band(s) used for DVB-H. Each of the antenna elements will thus be used for part of said frequency band, namely, normally for the part in which the antenna element will have its maximum gain.

FIG. 20B schematically illustrates the gain of the two antenna elements, that is, of antenna element 2001 having a longer electrical length, and the antenna element 2002 having a shorter electrical length. The first one of these antenna elements has a maximum gain at frequency $f_1$. The second one of these antenna elements has a maximum gain at a frequency $f_2$, $f_2>f_1$.

Line 2010 schematically illustrates a standard specification for minimum gain along a frequency band $f_{min}$–$f_{max}$ (which could be the interval of 470-770 MHz). Now, if the two antenna elements would be completely independent, it would be difficult to obtain sufficient gain all over the frequency spectrum. However, this can be overcome by means of letting at least one of said antenna elements act as a parasitic element for another one of the antenna elements. Here, the first antenna element has been arranged to act as a parasitic element for the second antenna element, so that the second antenna element has a local maximum of gain at a third frequency ($f_3$) different from said first frequency ($f_1$) and second frequency ($f_2$). In this way, the gain of the second antenna element improves at the lower end of the frequency band (this has been schematically illustrated in FIG. 20B (cf. the local maximum of gain at $f_3$).

Also, in accordance with one possible arrangement, the second antenna element can also be arranged to act as a parasitic element for the first antenna element at certain frequencies, which could imply a local maximum of gain of the first antenna element at a fourth frequency ($f_4$), as schematically illustrated in FIG. 21A (in which an antenna system is shown similar to the one of FIG. 20A, but with also the shorter antenna element 2002 being grounded through a matching circuit 2006) and in FIG. 21B (schematically illustrating the gain of the two antenna elements of FIG. 21A). Thus, in FIG. 21B it can be observed how the maximum gain at the fourth frequency implies that the corresponding gain curve is "lifted" above the corresponding specification line 2110, so that at least one of the antenna elements has a gain above the specified threshold 21 for any frequency within the relevant frequency band ($f_{min}$–$f_{max}$).

Normally, it can be enough that one of the antenna elements acts as a parasitic element for the other one, as illustrated in FIGS. 20A and 20B.

FIG. 9 illustrates two views of one possible practical implementation of the invention. Two conducting elements are mounted on a dielectric carrier, forming a first (2001) and a second (2002) antenna element. Each antenna element is embodied by a substantially flat, 2-3 mm wide wire arranged over several of the surfaces of a dielectric, substantially parallelepipedal carrier element. The path followed by each antenna element is schematically illustrated at the bottom of FIG. 9. Advantageously, the carrier might be the same for said first and second antenna elements. For the sake of compactness and electromagnetic response (gain, bandwidth, efficiency, etc.), one or more of the conducting elements might include at least one portion shaped as a multilevel (MLV) or space-filling curve (SFC) geometry for an antenna device. Such conducting elements might, for instance, be formed by stamping a metal plate, or by printing a rigid or flexible printed circuit board film, or by using other manufacturing processes such as, for instance, double-injection molding and MID techniques. At least a portion of one or more of said conducting elements might be bent over one or more surfaces of said dielectric carrier, arranging the antenna system in a volume (3D) space (as shown in FIG. 9). At least a portion of one or more of said conducting elements might become totally or partially embedded inside the dielectric carrier, by means of, for instance, an overmolding injection process.

Each of said two antenna elements in FIG. 9 includes a feeding conductor that connects each of said antenna elements to a pad or other connection means on the PCB. In some embodiments, both antenna elements are electrically combined by means of a passive RF network. In some embodiments, both antenna elements are combined by means of a switch, which might additionally include (or not), a passive matching network.

Each of said two antenna elements is tuned to a different frequency. In some embodiments, said frequencies are within the desired TV band (such as for instance the 470-770 MHz band), while in some embodiments, one or both are tuned to a center frequency outside said band.

The antenna system including said two antennas can be mounted close to one edge of the PCB. In case of elongated PCBs and devices, the antenna system can, for example, be placed substantially close to a shorter edge of said PCB.

At least one portion of the ground layer or ground plane 2004 within the footprint of the antenna system on the PCB can be removed, leaving a clearance 900 on the ground layer of the PCB (as shown in FIG. 9), that is, producing an area of the PCB in which there is no ground layer. In some embodiments, the area without a ground layer under the antenna footprint can be larger than a 50% of said footprint, in some embodiments it can be larger than 80 or 90% of said footprint. In other embodiments, the clearance (the area without presence of a ground layer) under the antenna footprint can be larger than the area covered by the antenna system footprint (or its projection) on the PCB, that is, the area without presence of a ground layer in correspondence with the antenna footprint can extend beyond said footprint and have an area corresponding to, for instance, 110%, 120% or more of said footprint area.

FIGS. 10A and 10B illustrate another embodiment of the present invention, comprising three antenna elements. In this example, two of said elements (2001, 2002) are formed over a plastic dielectric carrier, and a third antenna element 1001 is lying over a ground clearance area on the PCB (that is, over an area of the PCB where no ground layer is present). This is achieved, for instance, by printing said third antenna element 1001 on the PCB. The shape of any of the three antenna elements might be selected from a group comprising: MLV shapes, SFC shapes, fractal, meander, polygonal and spiral shapes. FIG. 10B illustrates how the antenna elements can be fed, including the antenna feeding for low frequencies 1010, the antenna feeding for medium frequencies 1020 and the antenna feeding for high frequencies 1030.

FIGS. 22A-22H illustrate another aspect of the invention, advantageously combined with the non-resonant antenna concept discussed above and especially useful for clam-shell type handheld devices or similar, used for DVB-H services and/or for services using the operating band of 470 MHz-770 MHz or similar.

Figure 22:
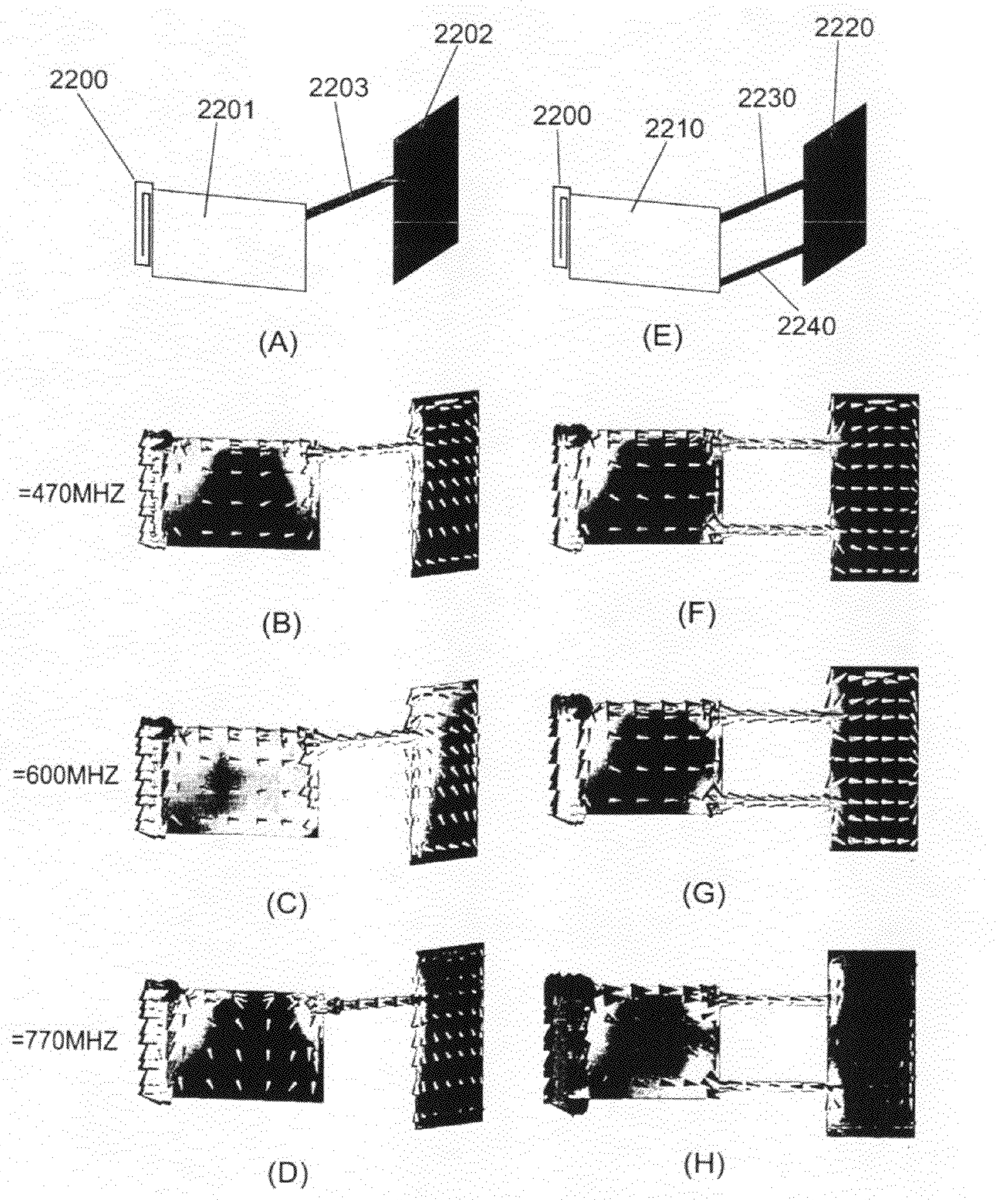

FIG. 22A illustrate a non-resonant antenna element 2200 arranged at a short end of a substantially rectangular first ground-plane portion 2201, the opposite short end of which is connected to a longer end of a substantially rectangular second ground-plane portion 2202 by an electrically conductive strip 2203. FIGS. 22B-22D illustrate the computed current distribution for different frequencies (470 MHz, 600 MHz and 770 MHz, respectively). It can be observed in FIG. 22B that the currents in the first 2201 and second 2202 ground-plane portions flow in substantially perpendicular directions. It can be observed in FIG. 22C that the currents in the first 2201 and second 2202 ground-plane portions flow in substantially perpendicular directions. A disadvantageous current distribution can be observed in FIG. 22D when the currents in the first 2201 and second 2202 ground-plane portions flow in substantially out of phase directions.

On the other hand, FIG. 22E illustrates how the non-resonant antenna element 2200 is arranged at a short end of a first substantially rectangular ground-plane portion 2210, the opposite short end of which is connected to a longer end of a substantially rectangular second ground-plane portion 2220 by two electrically conductive strip 2230, 2240, arranged close to respective opposite end portions of the short end of the first ground-plane portion 2210.

FIGS. 22F-22H illustrate the computed current distribution for different frequencies (470 MHz, 600 MHz and 770 MHz, respectively). It can be observed in FIGS. 22F and 22G that the currents in the first 2210 and second 2220 ground-plane portions flow in phase. It can be observed in FIG. 22H that the currents in the first 2210 and second 2220 ground-plane portions flow in substantially perpendicular directions. The disadvantageous effect observed in FIG. 22D is overcome and the current distributions of FIGS. 22B and 22C are improved by using a second conductive strip 2240. It can be seen in FIGS. 22F, 22G and 22H that the currents flow substantially in phase, resulting in an improved gain.

It has been observed that using the two-strip connection, a better gain can be obtained at least in the higher range of the 470 MHz-770 MHz frequency band. FIG. 23A schematically illustrates the gain in the horizontal plane as compared to a standard specification gain requirement 2300 for DVB-H, when using one strip for interconnecting the two ground-plane portions. It can be observed that the gain is sufficient up to around 600 MHz, but insufficient in the higher range of the 470 MHz-770 MHz operating band. Contrarily, in FIG. 23B, showing a simulation based on the same antenna system but using two strips to interconnect the two ground-plane portions (as illustrated in FIG. 22E), it can be observed that sufficient gain is obtained over substantially the entire 470 MHz-770 MHz frequency band. Thus, for claim-shell devices, using two strips instead of one strip to interconnect the two ground-plane portions can be preferred. At least at a first look, the width of the strips appear to be a less relevant parameter. (FIGS. 23A and 23B correspond to measurements of a non-resonant antenna and using a matching network comprising a series inductance of 22 nH).

FIG. 11 illustrates a means to tune one or more of the antenna elements, according to an embodiment of the present invention. A portion of an element is printed on a PCB, and some pads for connecting electronic components are inserted in one or more regions of said portion of said element. Those pads are used to connect one or more electronic components, such as for instance inductors, capacitors, resistances, LC networks and/or switches.

In the embodiment illustrated in FIG. 11, the antenna element comprises at least one portion 1101 including bridges or switches (1102, 1103, 1104) which can be set in an open or closed state. This one portion 1101 can be connected to a feeding pad and matching circuit by another portion 1105 of the antenna element. Now, the effective electrical length of the antenna element can be changed by selectively open or closing the switches 1102-1104. Thus, when switch 1104 is closed, the antenna element can constitute a monopole antenna tuned to a first frequency. If switch 1104 and 1103 are open but switch 1102 is closed, the antenna element can constitute a monopole antenna tuned to a second frequency lower than said first frequency. Further, if all of switches 1104, 1103 and 1102 are open, the electrical length is further increased, and the antenna element is tuned to a third, even lower, frequency.

Space Filling Curves

In some examples, one or more of the antenna elements may be miniaturized by shaping at least a portion of the antenna element (e.g., a part of an arm in a dipole or in a monopole, a perimeter of the patch of a patch antenna, the slot in a slot antenna, the loop perimeter in a loop antenna or in a gap-loop antenna, or other portions of the antenna) as a space-filling curve (SFC). Examples of space filling curves (including for instance the Hilbert curve or the Peano curve) are shown in FIG. 2 (see curves 201 to 214). A SFC is a curve that is large in terms of physical length but small in terms of the area in which the curve can be included. Space filling curves fill the surface or volume where they are located in an efficient way while keeping the linear properties of being curves. In general space filling curves may be composed of straight, substantially straight and/or curved segments. More precisely, for the purposes of this patent document, a SFC may be defined as follows: a curve having at least a minimum number of segments that are connected in such a way that each segment forms an angle (or bend) with any adjacent segments, such that no pair of adjacent segments defines a larger straight segment. The bends between adjacent segments increase the degree of convolution of the SFC leading to a curve that is geometrically rich in at least one of edges, angles, corners or discontinuities, when considered at different levels of detail. In some cases, the corners formed by adjacent segments of the SFC may be rounded or smoothed. Possible values for the said minimum number of segments include 5, 6, 7, 8, 10, 12, 14, 16, 18, 20, 25, 30, 35, 40, 45 and 50. In addition, a SFC does not intersect with itself at any point except possibly the initial and final point (that is, the whole curve can be arranged as a closed curve or loop, but none of the lesser parts of the curve form a closed curve or loop).

A space-filling curve can be fitted over a flat surface, a curved surface, or even over a surface that extends in more than one plane, and due to the angles between segments, the physical length of the curve is larger than that of any straight line that can be fitted in the same area (surface) as the space-filling curve. Additionally, to shape the structure of a miniature antenna, the segments of the SFCs should be shorter than at least one fifth of the free-space operating wavelength, and possibly shorter than one tenth of the free-space operating wavelength. Moreover, in some further examples the segments of the SFCs should be shorter than at least one twentieth of the free-space operating wavelength. The space-filling curve should include at least five segments in order to provide some antenna size reduction; however a larger number of segments may be used, such as for instance 10, 15, 20, 25 or more segments. In general, the larger the number of segments and the narrower the angles between them, the smaller the size of the final antenna. An antenna shaped as a SFC is small enough to fit within a radian sphere (e.g., a sphere with a radius equal to the longest free-space operating wavelength of the antenna divided by $2\pi$). However, the antenna features a resonance frequency lower than that of a straight line antenna substantially similar in size.

A SFC may also be defined as a non-periodic curve including a number of connected straight, substantially straight and/or curved segments smaller than a fraction of the longest operating free-space wavelength, where the segments are arranged in such a way that no adjacent and connected segments form another longer straight segment and wherein none of said segments intersect each other.

Alternatively, a SFC can be defined as a non-periodic curve comprising at least a minimum number of bends, wherein the distance between each pair of adjacent bends is shorter than a tenth of the longest free-space operating wavelength. Possible values of said minimum number of bends include 5, 10, 15, 20 and 25. In some examples, the distances between pairs of consecutive bends of the SFC are different for at least two pairs of bends. In some other examples, the radius of curvature of each bend is smaller than a tenth of the longest operating free-space wavelength.

Yet another definition of a SFC is that of a non-periodic curve comprising at least a minimum number of identifiable cascaded sections. Each section of the SFC forms an angle with other adjacent sections, and each section has a diameter smaller than a tenth of the longest free-space operating wavelength. Possible values of said minimum number of identifiable cascaded sections include 5, 10, 15, 20 and 25.

In one example, an antenna geometry forming a space-filling curve may include at least five segments, each of the at least five segments forming an angle with each adjacent segment in the curve, at least three of the segments being shorter than one-tenth of the longest free-space operating wavelength of the antenna. Preferably each angle between adjacent segments is less than 180° and at least two of the angles between adjacent sections are less than 115°, and at least two of the angles are not equal. The example curve fits inside a rectangular area, the longest side of the rectangular area being shorter than one-fifth of the longest free-space operating wavelength of the antenna. Some space-filling curves might approach a self-similar or self-affine curve, while some others would rather become dissimilar, that is, not displaying self-similarity or self-affinity at all (see for instance 210, 211, 212).

Box-Counting Curves

In other examples, one or more of the antenna elements may be miniaturized by shaping at least a portion of the antenna element to have a selected box-counting dimension. For a given geometry lying on a surface, the box-counting dimension is computed as follows. First, a grid with rectangular or substantially squared identical boxes of size L1 is placed over the geometry, such that the grid completely covers the geometry, that is, no part of the curve is out of the grid. The number of boxes N1 that include at least a point of the geometry are then counted. Second, a grid with boxes of size L2 (L2 being smaller than L1) is also placed over the geometry, such that the grid completely covers the geometry, and the number of boxes N2 that include at least a point of the geometry are counted. The box-counting dimension D is then computed as:

$$D = -\frac{\log(N2) - \log(N1)}{\log(L2) - \log(L1)}$$

For the purposes of this document, the box-counting dimension may be computed by placing the first and second grids inside a minimum rectangular area enclosing the conducting trace of the antenna and applying the above algorithm. The first grid in general has n×n boxes and the second grid has 2n×2n boxes matching the first grid. The first grid should be chosen such that the rectangular area is meshed in an array of at least 5×5 boxes or cells, and the second grid should be chosen such that L2=½ L1 and such that the second grid includes at least 10×10 boxes. The minimum rectangular area is an area in which there is not an entire row or column on the perimeter of the grid that does not contain any piece of the curve. Further the minimum rectangular area preferably refers to the smallest possible rectangle that completely encloses the curve or the relevant portion thereof.

An example of how the relevant grid can be determined is shown in FIG. 3*a* to 3*c*. In FIG. 3*a* a box-counting curve is shown in it smallest possible rectangle that encloses that curve. The rectangle is divided in an n×n (here as an example 5×5) grid of identical rectangular cells, where each side of the cells corresponds to 1/n of the length of the parallel side of the enclosing rectangle. However, the length of any side of the rectangle (e.g., Lx or Ly in FIG. 3*b*) may be taken for the calculation of D since the boxes of the second grid (see FIG. 3*c*) have the same reduction factor with respect to the first grid along the sides of the rectangle in both directions (x and y direction) and hence the value of D will be the same no matter whether the shorter (Lx) or the longer (Ly) side of the rectangle is taken into account for the calculation of D. In some rare cases there may be more than one smallest possible rectangle. In this case the smallest possible rectangle giving the smaller value of D is chosen.

Alternatively the grid may be constructed such that the longer side (see left edge of rectangle in FIG. 3*a*) of the smallest possible rectangle is divided into n equal parts (see L1 on left edge of grid in FIG. 4*a*) and the n×n grid of squared boxes has this side in common with the smallest possible rectangle such that it covers the curve or the relevant part of the curve. In FIG. 4*a* the grid therefore extends to the right of the common side. Here there may be some rows or columns which do not have any part of the curve inside (see the ten boxes on the right hand edge of the grid in FIG. 4*a*). In FIG. 4*b* the right edge of the smallest rectangle (see FIG. 3*a*) is taken to construct the n×n grid of identical square boxes. Hence, there are two longer sides of the rectangular based on which the n×n grid of identical square boxes may be constructed and therefore preferably the grid of the two first grids giving the smaller value of D has to be taken into account.

If the value of D calculated by a first n×n grid of identical rectangular boxes (FIG. 3*b*) inside of the smallest possible rectangle enclosing the curve and a second 2n×2n grid of identical rectangular boxes (FIG. 3*c*) inside of the smallest possible rectangle enclosing the curve and the value of D calculated from a first n×n grid of squared identical boxes (see FIG. 4*a* or 4*b*) and a second 2n×2n grid of squared identical boxes where the grid has one side in common with the smallest possible rectangle, differ, then preferably the first and second grid giving the smaller value of D have to be taken into account.

The desired box-counting dimension for the curve may be selected to achieve a desired amount of miniaturization. The box-counting dimension should be larger than 1.1 in order to achieve some antenna size reduction. If a larger degree of miniaturization is desired, then a larger box-counting dimension may be selected, such as a box-counting dimension ranging from 1.5 to 2 for surface structures, while ranging up to 3 for volumetric geometries. For the purposes of this patent document, curves in which at least a portion of the geometry of the curve or the entire curve has a box-counting dimension larger than 1.1 may be referred to as box-counting curves.

Alternatively a curve may be considered as a box counting curve if there exists a first n×n grid of identical square or identical rectangular boxes and a second 2n×2n grid of identical square or identical rectangular boxes where the value of D is larger than 1.1, 1.15, 1.2, 1.25, 1.3, 1.35, 1.4, 1.5, 1.6, 1.7, 1.8, 1.9, 2.0, 2.1, 2.2, 2.3, 2.4, 2.5, 2.6, 2.7, 2.8, or 2.9.

In any case, the value of n for the first grid should not be more than 5, 7, 10, 15, 20, 25, 30, 40 or 50.

For very small antennas, for example antennas that fit within a rectangle having a maximum size equal to one-twentieth the longest free-space operating wavelength of the antenna, the box-counting dimension may be computed using a finer grid. In such a case, the first grid may include a mesh of 10×10 equal cells, and the second grid may include a mesh of 20×20 equal cells. The grid-dimension (D) may then be calculated using the above equation.

In general, for a given resonant frequency of the antenna, the larger the box-counting dimension, the higher the degree of miniaturization that will be achieved by the antenna.

One way to enhance the miniaturization capabilities of the antenna (that is, reducing size while maximizing bandwidth, efficiency and gain) is to arrange the several segments of the curve of the antenna pattern in such a way that the curve intersects at least one point of at least 14 boxes of the first grid with 5×5 boxes or cells enclosing the curve. If a higher degree of miniaturization is desired, then the curve may be arranged to cross at least one of the boxes twice within the 5×5 grid, that is, the curve may include two non-adjacent portions inside at least one of the cells or boxes of the grid. The relevant grid here may be any of the above mentioned constructed grids or may be any grid. That means if any 5×5 grid exists with the curve crossing at least 14 boxes or crossing one or more boxes twice the curve may be said to be a box counting curve.

FIG. 1 illustrates an example of how the box-counting dimension of a curve (100) is calculated. The example curve (100) is placed under a 5×5 grid (101) (FIG. 1 upper part) and under a 10×10 grid (102) (FIG. 1 lower part). As illustrated, the curve (100) touches N1=25 boxes in the 5×5 grid (101) and touches N2=78 boxes in the 10×10 grid (102). In this case, the size of the boxes in the 5×5 grid 2 is twice the size of the boxes in the 10×10 grid (102). By applying the above equation, the box-counting dimension of the example curve (100) may be calculated as D=1.6415. In addition, further miniaturization is achieved in this example because the curve (100) crosses more than 14 of the 25 boxes in grid (101), and also crosses at least one box twice, that is, at least one box contains two non-adjacent segments of the curve. More specifically, the curve (100) in the illustrated example crosses twice in 13 boxes out of the 25 boxes.

The terms explained above can be also applied to curves that extend in three dimensions. If the extension in the third dimension is rather small the curve will fit into an n×n×1 arrangement of 3D-boxes (cubes of size L1×L1×L1) in a plane. Then the calculations can be performed as described above. Here the second grid will be a 2n×2n×1 grid of cuboids of size L2×2×L1.

If the extension in the third dimension is larger an n×n×n first grid and a 2n×2n×2n second grid will be taken into account. The construction principles for the relevant grids as explained above for two dimensions apply equally in three dimensions.

Grid Dimension Curves

In yet other examples, one or more of the antenna elements may be miniaturized by shaping at least a portion of the antenna element to include a grid dimension curve. For a given geometry lying on a planar or curved surface, the grid dimension of the curve may be calculated as follows. First, a grid with substantially square identical cells of size L1 is placed over the geometry of the curve, such that the grid completely covers the geometry, and the number of cells N1 that include at least a point of the geometry are counted. Second, a grid with cells of size L2 (L2 being smaller than L1) is also placed over the geometry, such that the grid completely covers the geometry, and the number of cells N2 that include at least a point of the geometry are counted again. The grid dimension D is then computed as:

$$D = -\frac{\log(N2) - \log(N1)}{\log(L2) - \log(L1)}$$

For the purposes of this document, the grid dimension may be calculated by placing the first and second grids inside the minimum rectangular area enclosing the curve of the antenna and applying the above algorithm. The minimum rectangular area is an area in which there is not an entire row or column on the perimeter of the grid that does not contain any piece of the curve.

The first grid may, for example, be chosen such that the rectangular area is meshed in an array of at least 25 substantially equal preferably square cells. The second grid may, for example, be chosen such that each cell of the first grid is divided in 4 equal cells, such that the size of the new cells is L2=½ L1, and the second grid includes at least 100 cells.

Depending on the size and position of the squares of the grid the number of squares of the smallest rectangular may vary. A preferred value of the number of squares is the lowest number above or equal to the lower limit of 25 identical squares that arranged in a rectangular or square grid cover the curve or the relevant portion of the curve. This defines the size of the squares. Other preferred lower limits here are 50, 100, 200, 250, 300, 400 or 500. The grid corresponding to that number in general will be positioned such that the curve touches the minimum rectangular at two opposite sides. The grid may generally still be shifted with respect to the curve in a direction parallel to the two sides that touch the curve. Of such different grids the one with the lowest value of D is preferred. Also the grid whose minimum rectangular is touched by the curve at three sides (see as an example FIGS. 4*a* and 4*b*) is preferred. The one that gives the lower value of D is preferred here.

The desired grid dimension for the curve may be selected to achieve a desired amount of miniaturization. The grid dimension should be larger than 1 in order to achieve some antenna size reduction. If a larger degree of miniaturization is desired, then a larger grid dimension may be selected, such as a grid dimension ranging from 1.5-3 (e.g., in case of volumetric structures). In some examples, a curve having a grid dimension of about 2 may be desired. For the purposes of this patent document, a curve or a curve where at least a portion of that curve is having a grid dimension larger than 1 may be referred to as a grid dimension curve. In some cases, a grid dimension curve will feature a grid dimension D larger than 1.1, 1.15, 1.2, 1.25, 1.3, 1.35, 1.4, 1.5, 1.6, 1.7, 1.8, 1.9, 2.0, 2.1, 2.2, 2.3, 2.4, 2.5, 2.6, 2.7, 2.8, or 2.9.

In general, for a given resonant frequency of the antenna, the larger the grid dimension the higher the degree of miniaturization that will be achieved by the antenna.

One example way of enhancing the miniaturization capabilities of the antenna is to arrange the several segments of the curve of the antenna pattern in such a way that the curve intersects at least one point of at least 50% of the cells of the first grid with at least 25 cells (preferably squares) enclosing the curve. In another example, a high degree of miniaturization may be achieved by arranging the antenna such that the curve crosses at least one of the cells twice within the 25 cell grid (of preferably squares), that is, the curve includes two non-adjacent portions inside at least one of the cells or cells of the grid. In general the grid may have only a line of cells but may also have at least 2 or 3 or 4 columns or rows of cells.

FIG. 5 shows an example two-dimensional antenna forming a grid dimension curve with a grid dimension of approximately two. FIG. 6 shows the antenna of FIG. 5 enclosed in a first grid having thirty-two (32) square cells, each with a length L1. FIG. 7 shows the same antenna enclosed in a second grid having one hundred twenty-eight (128) square cells, each with a length L2. The length (L1) of each square cell in the first grid is twice the length (L2) of each square cell in the second grid (L1=2×L2). An examination of FIG. 6 and FIG. 7 reveals that at least a portion of the antenna is enclosed within every square cell in both the first and second grids. Therefore, the value of N1 in the above grid dimension ($D_g$) equation is thirty-two (32) (i.e., the total number of cells in the first grid), and the value of N2 is one hundred twenty-eight (128) (i.e., the total number of cells in the second grid). Using the above equation, the grid dimension of the antenna may be calculated as follows:

$$D_g = -\frac{\log(128) - \log(32)}{\log(2 \times L1) - \log(L1)} = 2$$

For a more accurate calculation of the grid dimension, the number of square cells may be increased up to a maximum amount. The maximum number of cells in a grid is dependent upon the resolution of the curve. As the number of cells approaches the maximum, the grid dimension calculation becomes more accurate. If a grid having more than the maximum number of cells is selected, however, then the accuracy of the grid dimension calculation begins to decrease. Typically, the maximum number of cells in a grid is one thousand (1000).

For example, FIG. 8 shows the same antenna as of FIG. 5 enclosed in a third grid with five hundred twelve (512) square cells, each having a length L3. The length (L3) of the cells in the third grid is one half the length (L2) of the cells in the second grid, shown in FIG. 7. As noted above, a portion of the antenna is enclosed within every square cell in the second grid, thus the value of N for the second grid is one hundred twenty-eight (128). An examination of FIG. 8, however, reveals that the antenna is enclosed within only five hundred nine (509) of the five hundred twelve (512) cells of the third grid. Therefore, the value of N for the third grid is five hundred nine (509). Using FIG. 7 and FIG. 8, a more accurate value for the grid dimension ($D_g$) of the antenna may be calculated as follows:

$$D_g = -\frac{\log(509) - \log(128)}{\log(2 \times L2) - \log(L2)} \approx 1.9915$$

It should be understood that a grid-dimension curve does not need to include any straight segments. Also, some grid-dimension curves might approach a self-similar or self-affine curves, while some others would rather become dissimilar, that is, not displaying self-similarity or self-affinity at all (see for instance FIG. 5).

The terms explained above can be also applied to curves that extend in three dimensions. If the extension in the third dimension is rather small the curve will fit into an arrangement of 3D-boxes (cubes) in a plane. Then the calculations can be performed as described above. Here the second grid will be composed in the same plane of boxes with the size L2×L2×L1.

If the extension in the third dimension is larger an m×n×o first grid and a 2m×2n×2o second grid will be taken into account. The construction principles for the relevant grids as explained above for two dimensions apply equally in three dimensions. Here the minimum number of cells preferably is 25, 50, 100, 125, 250, 400, 500, 1000, 1500, 2000, 3000, 4000 or 5000.

Multilevel Structures

In another example, at least a portion of one or more of the antenna elements may be coupled, either through direct contact or electromagnetic coupling, to a conducting surface, such as a conducting polygonal or multilevel surface. Further, the antenna element may include the shape of a multilevel structure. A multilevel structure is formed by gathering several identifiable geometrical elements such as polygons or polyhedrons of the same type or of different type (e.g., triangles, parallelepipeds, pentagons, hexagons, circles or ellipses as special limiting cases of a polygon with a large number of sides, as well as tetrahedral, hexahedra, prisms, dodecahedra, etc.) and coupling these structures to each other electromagnetically, whether by proximity or by direct contact between elements.

At least two of the elements may have a different size. However, also all elements may have the same or approximately the same size. The size of elements of a different type may be compared by comparing their largest diameter. The polygons or polyhedrons of a multilevel structure may comprise straight, flat and/or curved peripheral portions. Some polygons or polyhedrons may have perimeter portions comprising portions of circles and/or ellipses.

The majority of the component elements of a multilevel structure have more than 50% of their perimeter (for polygons) or of their surface (for polyhedrons) not in contact with any of the other elements of the structure. In some examples, the said majority of component elements would comprise at least the 50%, 55%, 60%, 65%, 70% or 75% of the geometric elements of the multilevel structure. Thus, the component elements of a multilevel structure may typically be identified and distinguished, presenting at least two levels of detail: that of the overall structure and that of the polygon or polyhedron elements which form it. Additionally, several multilevel structures may be grouped and coupled electromagnetically to each other to form higher level structures. In a single multilevel structure, all of the component elements are polygons with the same number of sides or are polyhedrons with the same number of faces. However, this characteristic may not be true if several multilevel structures of different natures are grouped and electromagnetically coupled to form meta-structures of a higher level.

A multilevel antenna includes at least two levels of detail in the body of the antenna: that of the overall structure and that of the majority of the elements (polygons or polyhedrons) which make it up. This may be achieved by ensuring that the area of contact or intersection (if it exists) between the majority of the elements forming the antenna is only a fraction of the perimeter or surrounding area of said polygons or polyhedrons. The elements (polygons or polyhedrons) are identifiable by their exposed edges and, when there is contact or overlapping between elements, by the extension of their exposed edges (such as for example through projection) into said region of contact or overlapping.

One example property of a multilevel antenna is that the radioelectric behavior of the antenna can be similar in more than one frequency band. Antenna input parameters (e.g., impedance) and radiation patterns remain substantially similar for several frequency bands (i.e., the antenna has the same level of impedance matching or standing wave relationship in each different band), and often the antenna presents almost identical radiation diagrams at different frequencies. Such a property allows the antenna to operate simultaneously in several frequencies, thereby being able to be shared by several communication devices. The number of frequency bands is proportional to the number of scales or sizes of the polygonal elements or similar sets in which they are grouped contained in the geometry of the main radiating element.

In a multilevel antenna operating in several frequency bands, different subsets of geometrical elements of the multilevel structure are associated with the different frequency bands of the antenna. In some cases for example, the overall structure can be responsible for one frequency, and different subsets of geometrical elements within the structure be responsible for other frequency bands. In some examples, a first subset of geometrical elements can comprise at least some of the geometrical elements of a second subset, while in other cases the first subset may comprise a majority of the geometrical elements of the second subset (i.e., the second subset is substantially within the first subset).

In addition to their multiband behavior, multilevel structure antennae may have a smaller than usual size as compared to other antennae of a simpler structure (such as those consisting of a single polygon or polyhedron) operating at the same frequency. The empty spaces defined within the multilevel structure provide a long and winding path for the electrical currents, making the antenna resonate at a lower frequency than that of a radiating structure not including said empty spaces. Additionally, the edge-rich and discontinuity-rich structure of a multilevel antenna may enhance the radiation process, relatively increasing the radiation resistance of the antenna and/or reducing the quality factor Q (i.e., increasing its bandwidth).

A multilevel antenna structure may be used in many antenna configurations, such as dipoles, monopoles, patch or microstrip antennae, coplanar antennae, reflector antennae, aperture antennae, antenna arrays, or other antenna configurations. In addition, multilevel antenna structures may be formed using many manufacturing techniques, such as printing on a dielectric substrate by photolithography (printed circuit technique); dying on metal plate, repulsion on dielectric, or others.

The invention claimed is:

1. A wireless portable device for radio communication, comprising:

at least one antenna element included within the wireless portable device;

at least one ground-plane having a length and a width, no ground-plane having a width larger than 55 mm;

radio frequency communication circuitry for processing a signal received through the at least one antenna element;

at least one matching network operatively arranged between the at least one antenna element and the radio frequency communication circuitry;

the device is arranged for communication involving at least, receiving and processing a signal in accordance with a communication system having a bandwidth with a lower frequency limit ($f_{min}$) and un upper frequency limit ($f_{max}$);

the at least one antenna element operates as a non-resonant antenna element for frequencies that are not lower than the lower frequency limit ($f_{min}$) and not higher than the higher frequency limit ($f_{max}$) so that an imaginary part of an input impedance of the at least one antenna element is not equal to zero for any frequency that is not lower than the lower frequency limit ($f_{min}$) and not higher than the higher frequency limit ($f_{max}$); and the at least one antenna element is configured so that the imaginary part of the input impedance for any selected frequency not lower than the lower frequency limit ($f_{min}$) and not higher than the higher frequency limit ($f_{max}$) is closer to zero than the imaginary part of the input impedance for any frequency not lower than the lower frequency limit ($f_{min}$) and lower than the selected frequency.

2. The device according to claim 1, wherein the at least one matching network comprises a plurality of different matching networks and switching means arranged so as to selectively operatively connect one of the matching networks between the at least one antenna element and the communication circuitry in accordance with a selected frequency sub-band within the lower frequency limit ($f_{min}$) and upper frequency limit ($f_{max}$).

3. The device according to claim 1, wherein the lower frequency limit is 88 MHz and the higher frequency limit is 108 MHz.

4. The device according to claim 1, wherein the lower frequency limit is 180 MHz and the higher frequency limit is 210 MHz.

5. The device according to claim 1, the device being a handheld device.

6. The device according to claim 1, wherein the device includes means for processing digital television signals and for displaying corresponding video images.

7. The device according to claim 1, wherein the device further comprising:

a casing housing, the at least one ground plane, and at least one antenna element, the casing being provided with an external conductive coating connected with the at least one ground plane so as to connect a user's hand to the at least one ground plane when the user is using the device.

8. The device according to claim 1, wherein at least one of the at least one antenna element includes a portion shaped as a space-filling curve.

9. The device according to claim 8, wherein the space-filling curve is fitted over a flat surface.

10. The device according to claim 8, wherein the space-filling curve comprises at least five segments, wherein each of the at least five segments forms an angle with each adjacent segment in the space-filling curve, wherein at least three of the at least five segments of the space-filling curve are shorter than one-fifth of a longest free-space operating wavelength of the antenna, wherein each angle between adjacent segments is less than 180°, and at least two of the angles between adjacent sections are less than approximately 115°.

11. The device according to claim 10, wherein a majority of the at least five segments of the space-filling curve are shorter than one-fifth of the longest free-space operating wavelength of the antenna.

12. The device according claim 1, wherein at least one of the at least one antenna element includes a portion shaped as a box-counting curve.

13. The device according to claim 12, wherein the space-filling curve has a box-counting dimension larger than 1.15.

14. The device according to claim 1, wherein at least one of the at least one antenna element includes a portion shaped as a grid dimension curve.

15. The device according to claim 14, wherein the space-filling curve has a grid dimension larger than 1.15.

16. The device according to claim 1, wherein each antenna element of the at least one antenna element fits in a rectangle, a largest side of which has a length that does not exceed one-fifth of a longest free-space operating wavelength of the at least one antenna element.

17. The device according to claim 1, wherein at least one of the at least one antenna element includes a portion having a multi-level structure.

18. A wireless portable device for radio communication, comprising:

at least one antenna element included within the wireless portable device;

at least one ground-plane having a length and a width, no ground-plane having a width larger than 55 mm;

radio frequency communication circuitry for processing a signal received through the at least one antenna element;

at least one matching network operatively arranged between the at least one antenna element and the communication circuitry;

the device is arranged for communication involving at least, receiving and processing a signal in accordance with a communication system having a bandwidth with a lower frequency limit ($f_{min}$) and a higher frequency limit ($f_{max}$);

the at least one antenna element operates as a non-resonant antenna element for frequencies that are not lower than the lower frequency limit ($f_{min}$) and not higher than the higher frequency limit ($f_{max}$) so that an imaginary part of an input impedance of the at least one antenna element is not equal to zero for any frequency that is not lower than the lower frequency limit ($f_{min}$) and not higher than the higher frequency limit ($f_{max}$); and the at least one antenna element is configured so that the imaginary part of the input impedance, for any selected frequency not lower than the lower frequency limit ($f_{min}$) and not higher than the higher frequency limit ($f_{max}$) is closer to zero than the imaginary part of the input impedance for any frequency not higher than the higher frequency limit ($f_{max}$) and higher than the selected frequency.

* * * * *

UNITED STATES PATENT AND TRADEMARK OFFICE
CERTIFICATE OF CORRECTION

PATENT NO. : 8,472,908 B2
APPLICATION NO. : 12/226024
DATED : June 25, 2013
INVENTOR(S) : Anguera et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this
Eighth Day of September, 2015

Michelle K. Lee
*Director of the United States Patent and Trademark Office*